United States Patent [19]

Takatori

[11] Patent Number: 5,647,552
[45] Date of Patent: Jul. 15, 1997

[54] PHOTO FILM CASSETTE

[75] Inventor: Tetsuya Takatori, Kanagawa, Japan

[73] Assignee: Fuji Photo Film Co., Ltd., Kanagawa, Japan

[21] Appl. No.: 525,179

[22] Filed: Sep. 8, 1995

[30] Foreign Application Priority Data

Sep. 21, 1994 [JP] Japan ..................... 6-226896

[51] Int. Cl.$^6$ ................................. G03B 17/26
[52] U.S. Cl. .......................... 242/348.4; 396/513
[58] Field of Search ...................... 242/348, 348.1, 242/348.2, 348.3, 348.4; 354/275; 396/512, 513

[56] References Cited

U.S. PATENT DOCUMENTS

| 4,832,275 | 5/1989 | Robertson . | |
| 4,834,306 | 5/1989 | Robertson et al. . | |
| 5,251,839 | 10/1993 | Zander | 242/348 |
| 5,265,819 | 11/1993 | Enomoto et al. . | |
| 5,296,887 | 3/1994 | Zander | 354/275 |
| 5,522,563 | 6/1996 | Earnhart et al. | 242/348 |

FOREIGN PATENT DOCUMENTS

| 62-284355 | 12/1987 | Japan . |
| 62-286043 | 12/1987 | Japan . |
| 4-362939 | 12/1992 | Japan . |

*Primary Examiner*—John M. Jillions
*Attorney, Agent, or Firm*—Sughrue, Mion, Zinn, Macpeak & Seas

[57] ABSTRACT

A photographic film cassette has a cassette shell which is constituted of a pair of resin molded shell halves joined together to enclose a roll of photographic filmstrip therein. A film passage slot is formed along an axial joint between the shell halves for allowing the photographic filmstrip to advance to the outside of the cassette shell. Two fasteners are disposed on opposite sides of the film passage port for fastening the axial joint. Each fastener is constituted of a hook and a retaining portion which are formed integrally with one and the other shell halves, respectively. The hook is resiliently engaged with the retaining portion, and secured to the retaining portion by ultrasonic welding. In the welded position, the hook presses the retaining portion in a direction to secure the shell halves to each other.

7 Claims, 18 Drawing Sheets

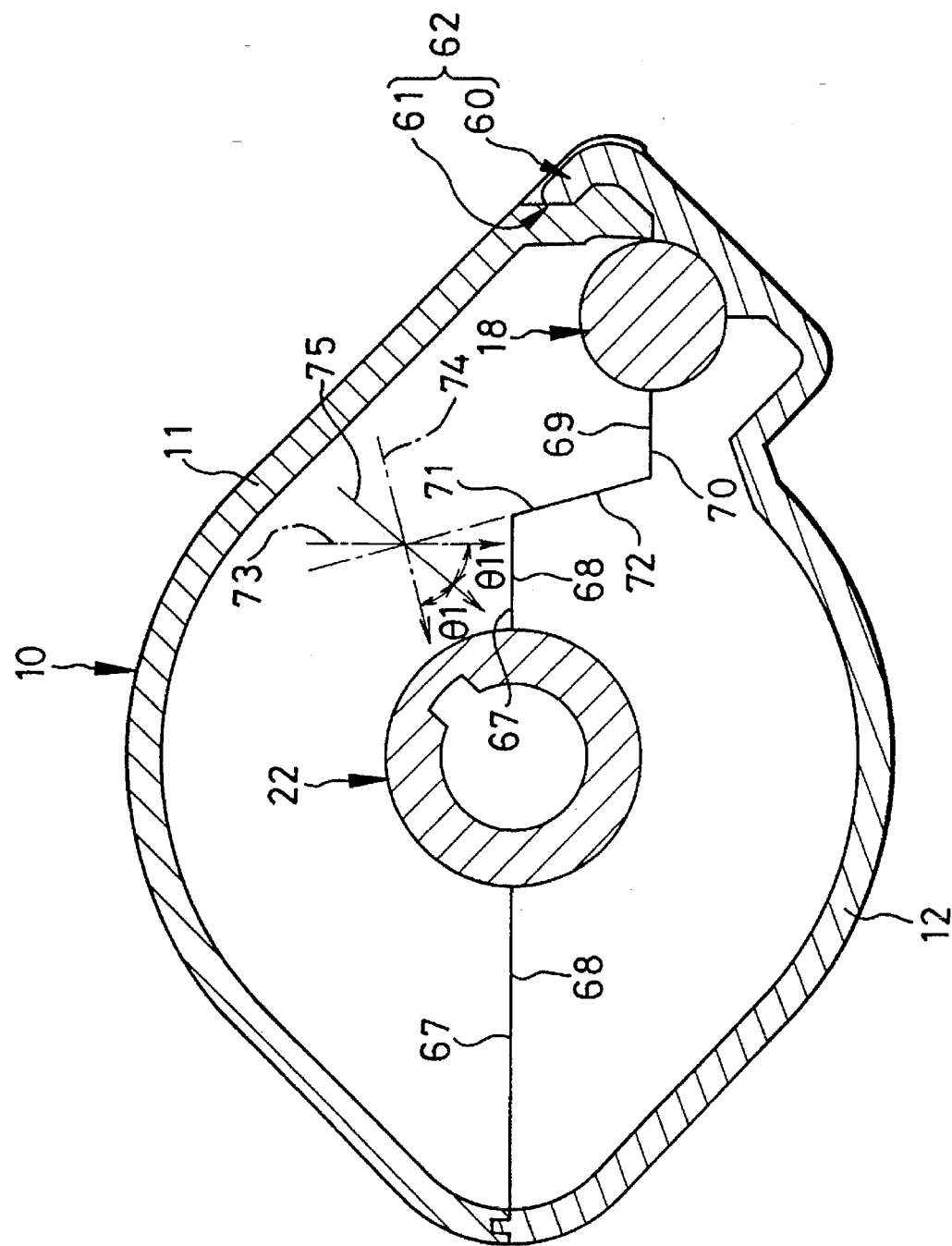

FIG. 9A
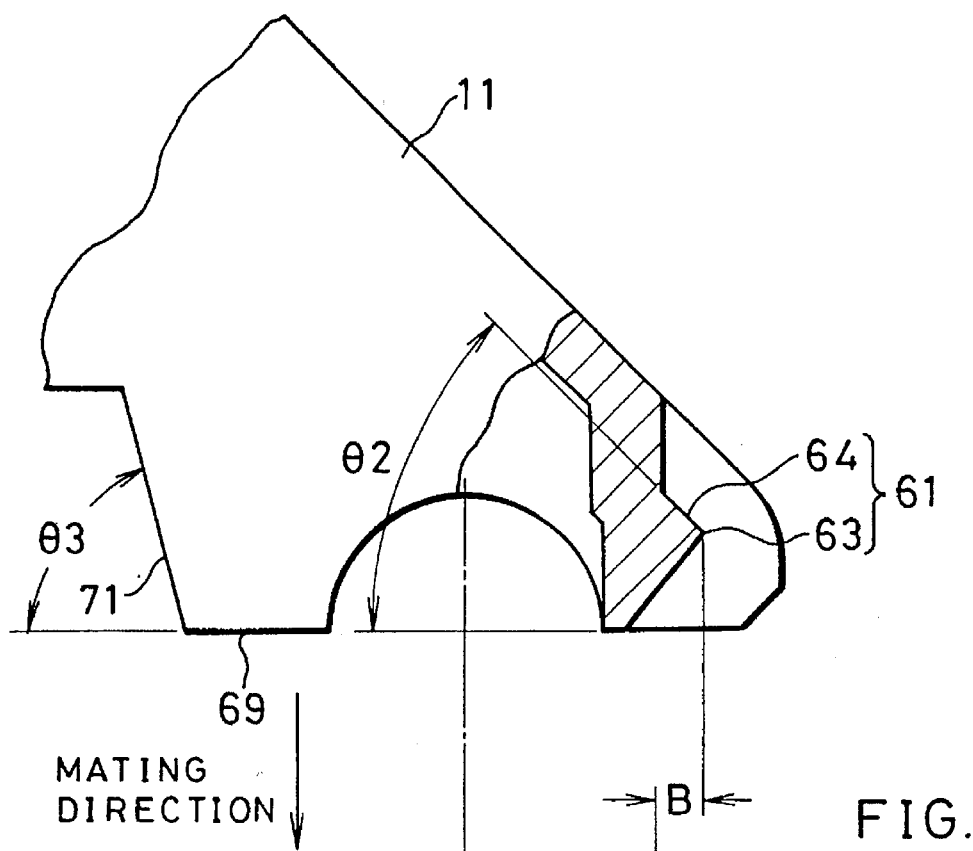
MATING DIRECTION
FIG. 9B
FIG. 9C
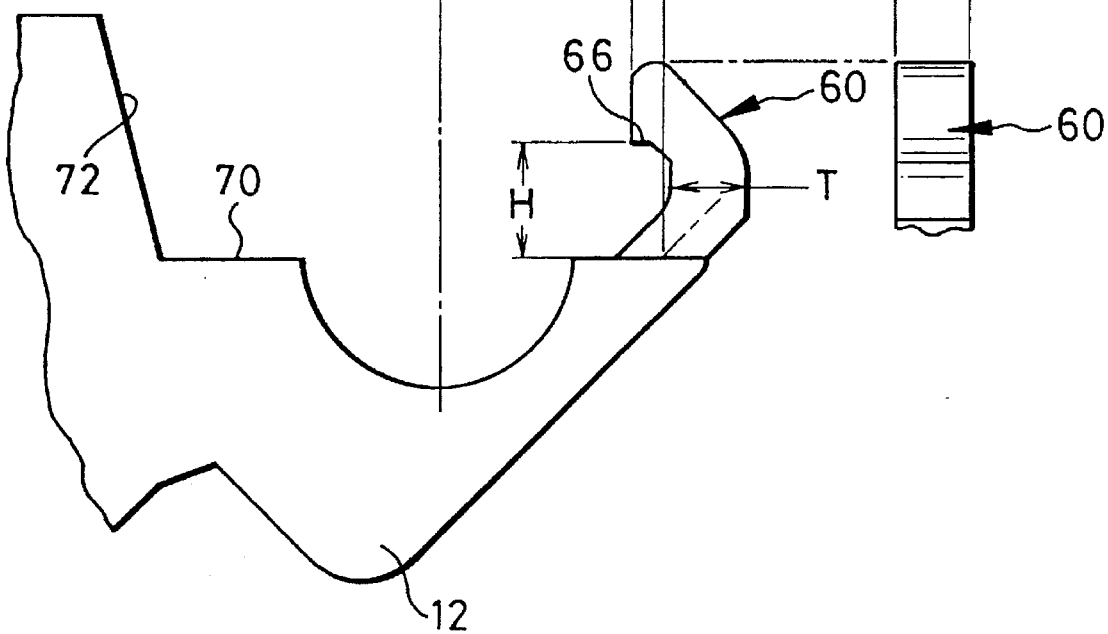

FIG. 12

| DISPLACEMENT "D" (mm) | THICKNESS "T" (mm) | | | |
|---|---|---|---|---|
| | 0.5 | 0.75 | 1.0 | 1.5 |
| 0.5 | OK | OK | OK | NG |
| 0.4 | OK | OK | OK | OK |
| 0.3 | OK | OK | OK | OK |
| 0.2 | OK | OK | OK | OK |
| 0.1 | OK | OK | OK | OK |
| 0 | OK | OK | OK | OK |
| −0.1 | NG | NG | NG | NG |
| −0.2 | NG | NG | NG | NG |
| −0.3 | NG | NG | NG | NG |
| −0.4 | NG | NG | NG | NG |
| −0.5 | NG | NG | NG | NG |

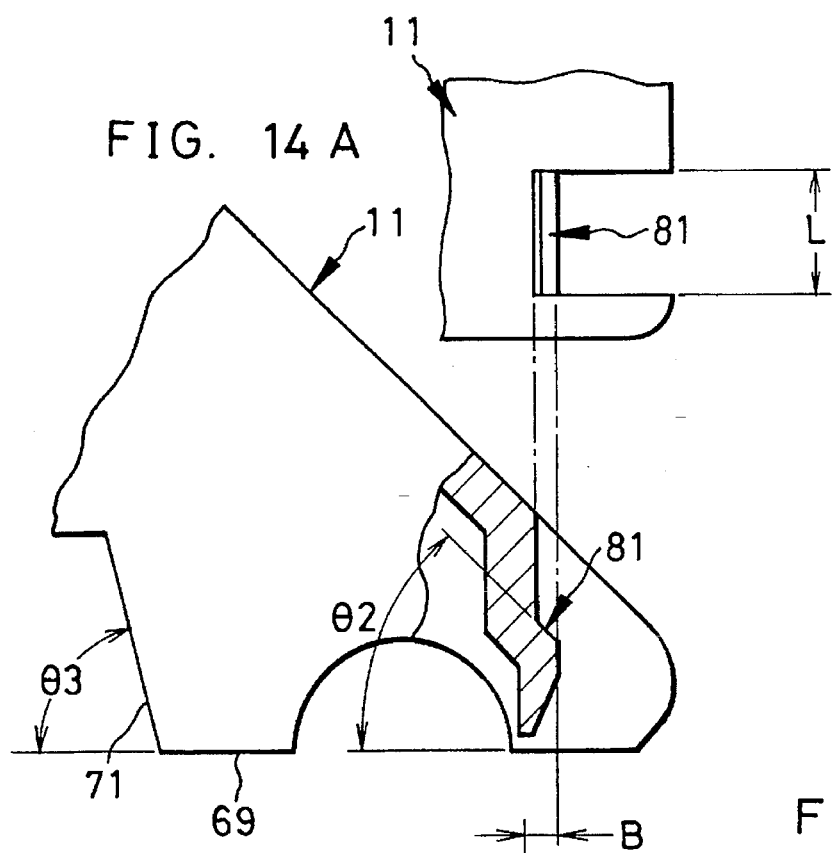
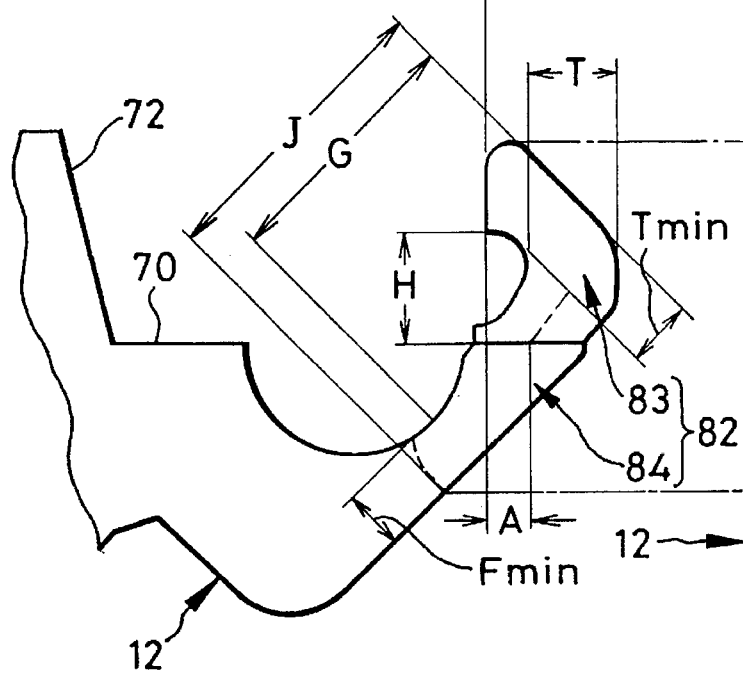
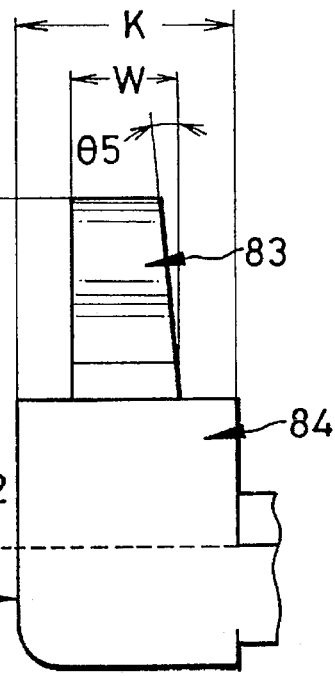

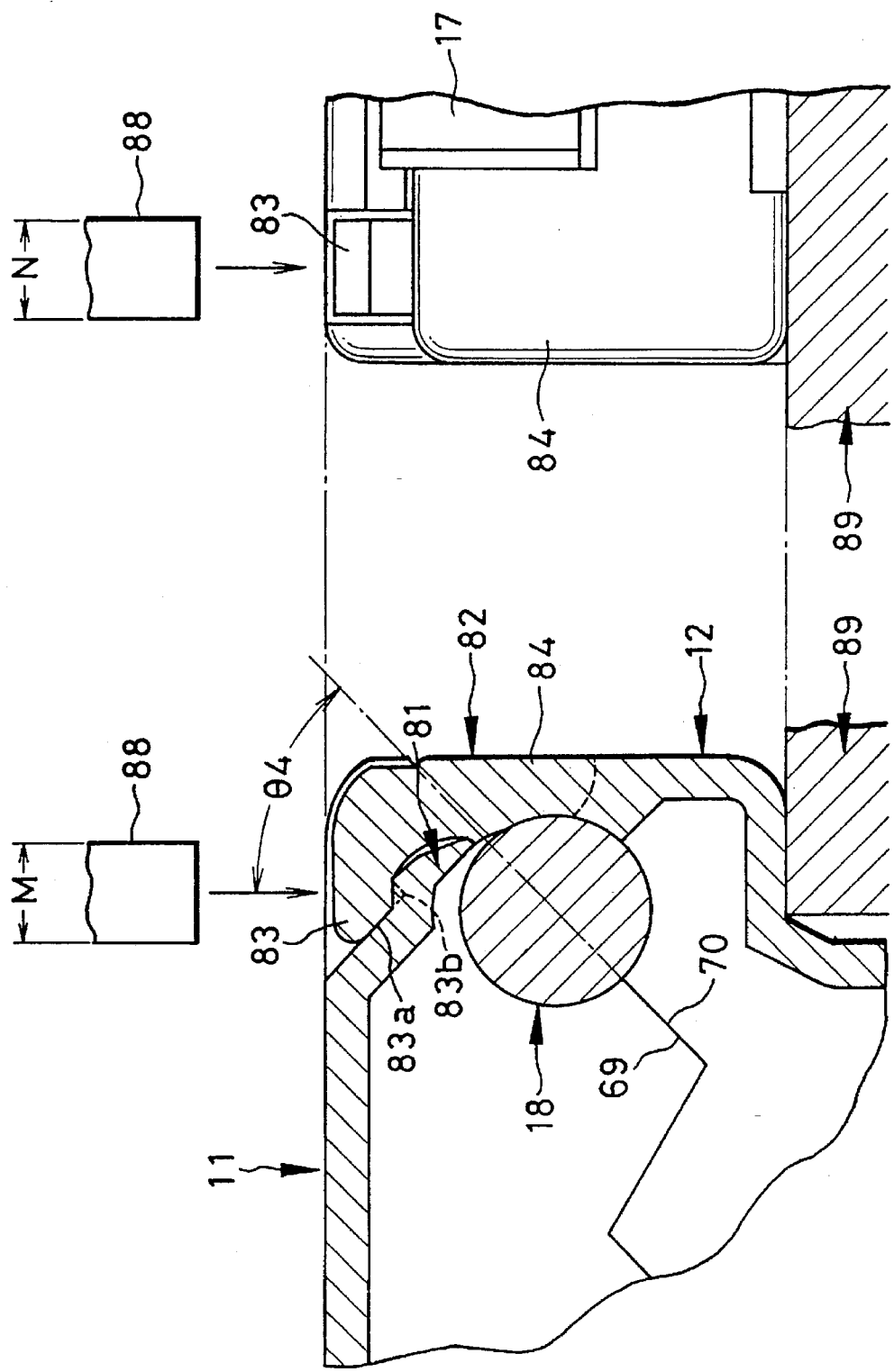

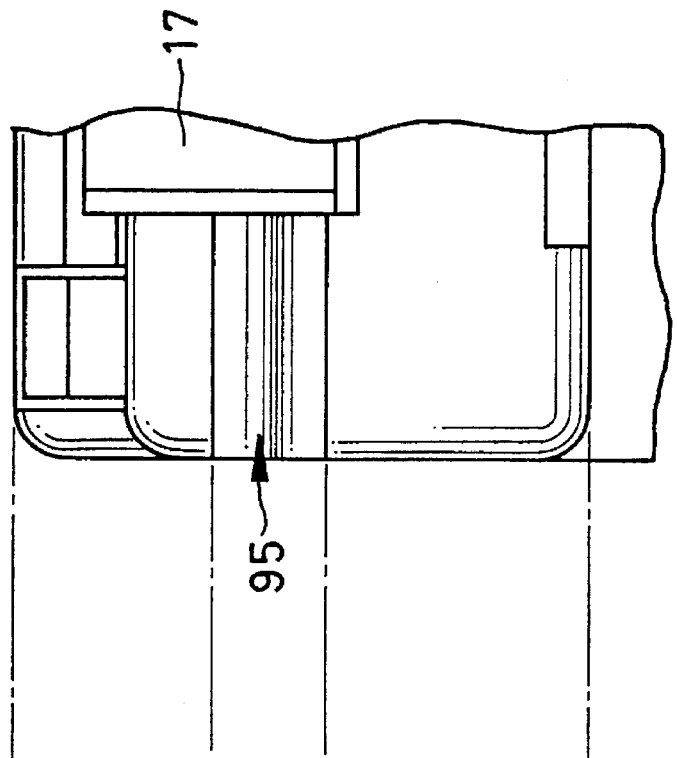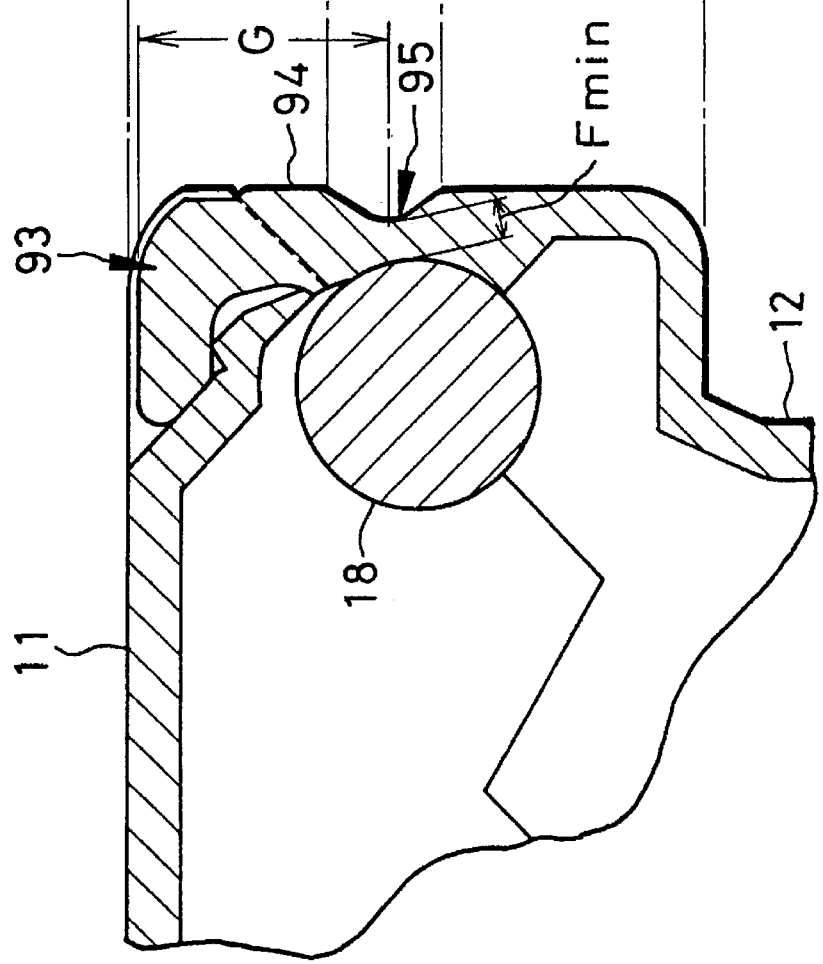

PHOTO FILM CASSETTE

BACKGROUND OF THE INVENTION

1. Field of the Invention

The present invention relates to a photo film cassette. More particularly, the present invention relates to a photo film cassette of which a cassette shell is constituted of a plurality of plastic molded parts joined together by snap-in engagement.

2. Background Art

U.S. Pat. Nos. 4,834,306 and 4,832,275 disclose a leader-advancing photo film cassette, in which a leader of a photo filmstrip is entirely contained in a cassette shell, and when a spool is rotated, the leader is responsively advanced to the outside of the cassette shell. It has been proposed, as in U.S. Pat. No. 5,265,819 (corresponding to JPA 4-362939), to construct such a cassette shell by use of a pair of molded shell halves, which are joined together fixedly in a snap in fashion, such that a passage slot is formed for the photo filmstrip between the shell halves. On either side of the passage slot, a juncture of joining the shell halves is provided with a stepped structure, constituted of a groove formed in one shell half and a ridge formed on the other shell half for being force-fitted in the groove. This stepped structure is formed to extend in an orthogonal direction to the passage slot.

PROBLEMS TO BE SOLVED BY THE INVENTION

According to a drop test where the film cassettes as disclosed in U.S. Pat. No. 5,265,819 were dropped from a 2 m height onto an iron plate, the engagement between the groove and the ridge became loose in some samples of the cassettes. It was found that the strength of the clicked engagement was insufficient because the ridge returned to its initial and unbiased condition in the completely engaged position, even though it was resiliently bent or deformed while being brought into engagement.

In other samples, joints between the shell halves became loose to thus deteriorate light-tightness and a dust free state of the interior of the cassette shell.

OBJECT OF THE INVENTION

In view of the foregoing, an object of the present invention is to provide an improved film cassette whose shell halves are securely joined together to ensure light-tightness and a dust free state of the interior of the cassette shell.

SUMMARY OF THE INVENTION

To achieve the above and other objects, the present invention provides two fasteners on opposite sides of the film passage slot for fastening the shell halves together, each of which are constituted of a hook formed integrally with one shell half and a retaining portion formed integrally with the other shell half, such that the hook is resiliently engaged with the retaining portion to be biased in a direction to press the retaining portion to secure the shell halves to each other.

In this way, the juncture between the shell halves is enforced, and dimensional tolerances of the hook and the retaining portion can be set larger to facilitate assembly of the cassette shell.

According to a preferred embodiment, the hook is supported by a stem which is integrally formed with the hook to have a smaller thickness than that of the hook, so as to be resiliently deformed to engage the hook with the retaining portion. This embodiment is intended to disperse the load or stress of deformation, which would otherwise be concentrated on a bent portion of the hook.

BRIEF DESCRIPTION OF THE DRAWINGS

The present invention will become apparent in the following detailed description of the preferred embodiments when read in connection with the accompanying drawings, wherein like reference numerals designates like or corresponding parts throughout the several views, and wherein:

FIG. 8 is an explanatory sectional view illustrating a fastener and joint surfaces between the shell halves, according to a first embodiment of the invention;

FIG. 9A is a fragmentary side view of the upper shell half, partly in section, illustrating the retaining portion of the first embodiment;

FIG. 9B is a fragmentary side view of the lower shell half, illustrating the hook portion of the first embodiment;

FIG. 9C is a side view of a portion of the hook shown in FIG. 9B.

FIG. 12 is a table showing results of drop tests using samples having differently dimensioned fasteners of the first embodiment;

FIG. 14A is an explanatory side view, partly in section, illustrating the retaining portion of the upper shell half of the second embodiment;

FIG. 14B is an explanatory side view illustrating the hook portion of the lower shell half of the second embodiment;

FIG. 14C is a fragmentary front view of the lower shell half, illustrating the hook portion of the second embodiment;

FIG. 14D is a fragmentary top plan view of the upper shell half, illustrating the retaining portion of the second embodiment;

FIG. 16A is a fragmentary sectional view of the film cassette having the fastener of the second embodiment in a welded position, in relation to an ultrasonic horn;

FIG. 16B is a fragmentary front view of the film cassette having the fastener of the second embodiment in the welded position, in relation to the ultrasonic horn;

FIG. 19A is a fragmentary sectional view of the film cassette having a fastener according to a third embodiment;

FIG. 19B is a fragmentary front view of the film cassette having the fastener of the third embodiment.

DETAILED DESCRIPTION OF THE PREFERRED EMBODIMENTS

Figure 1:
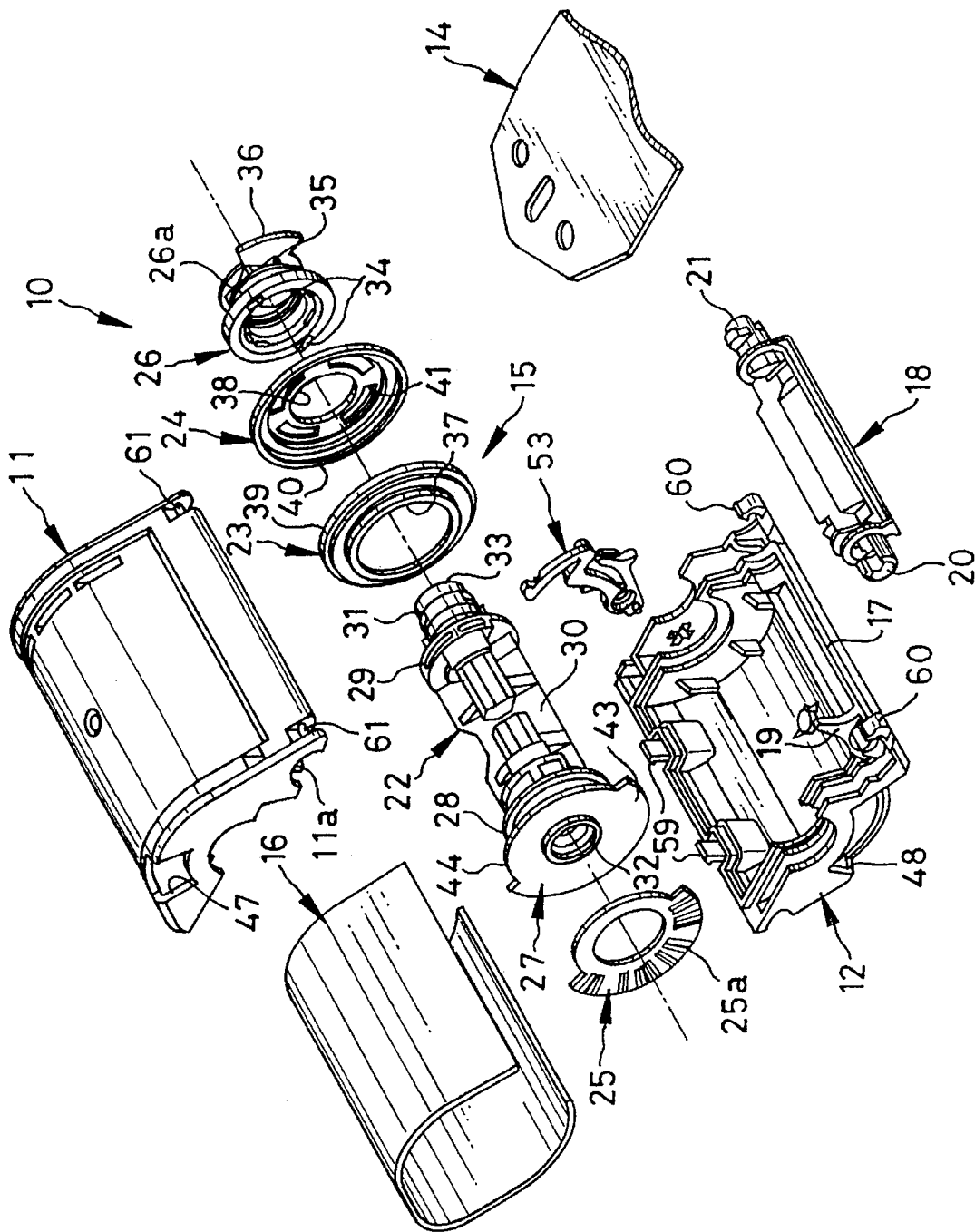
FIG. 1 is an exploded perspective view of a film cassette according to a preferred embodiment of the invention.
Figure 2:
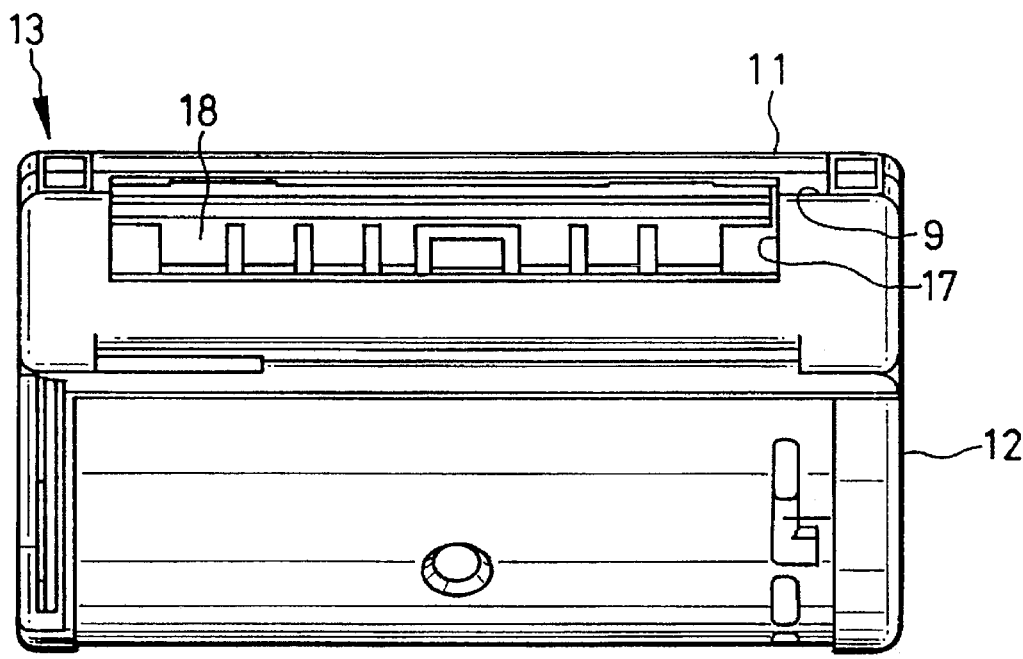
FIG. 2 is a front view of the film cassette shown in FIG. 1.

FIGS. 1 to 6 illustrate a photo film cassette 10, which is constituted of a cassette shell 13, a spool 15 rotatably contained in the cassette shell 13, a photo filmstrip 14 wound on the spool 15 into a roll, and a shell label 16 adhered to a peripheral surface of the cassette shell 13. The cassette shell 13 is constituted of a pair of shell halves 11 and 12, each being a molded part formed from resin.

A passage slot 17 for the photo filmstrip 14 is formed along a front juncture 9 between the shell halves 11 and 12. Behind the passage slot 17 is disposed a light-shielding door 18 which is closed to prevent ambient light from entering the cassette interior through the passage slot 17. A separation claw 19 is disposed behind the door 18 to separate a leader of the photo filmstrip 14 from the roll and guide it toward the passage slot 17. The door 18 has key grooves 20 and 21 on both ends thereof for allowing the door 18 to be rotated by corresponding drive shafts of a camera between the closed position and an open position for enabling the filmstrip 14 to pass through the slot 17. The door 18 may be locked by a lock pole 11a formed on the upper shell half 11, as is implied in FIG. 5.

The spool 15 is constituted of a spool core 22, a pair of flanges 23 and 24 mounted on opposite ends of the spool core 22, a data disc 27 mounted outside the one flange 23, and an indication ring 26 mounted outside the other flange 24. A bar code label 25 is adhered to the data disc 27. Engaging portions 28 and 29 are integrally formed with the spool core 22. The engaging portion 28 is for engaging the data disc 27 and the flange 23, and the engaging portion 29 is for the flange 24. A slit 30 for securing a film trailer is also formed through the spool core 22. A supporting portion 31 for the indication ring 26 is formed outside the engaging portion 29. Key grooves are formed in end faces 32 and 33 of the spool core 22 for engagement with drive shafts of the camera.

The indication ring 26 has a bearing portion 26a, two ratchet claws 34, a gear 35 and an indication flag 36 formed integrally into a part. The indication ring 26 rotates together with the spool core 22.

A spool lock 53 is mounted inside the cassette shell 13. The spool lock 53 is able to mesh with the gear 35 when the door 18 is in the closed position, to lock the spool core 22 in a stationary state to prevent the filmstrip 14 from advancing. When the door 18 is opened, the spool lock 53 is disengaged from the gear 35.

The flanges 23 and 24 are formed from a plastic material to be thin and elastic discs. Round holes 37 and 38 are formed in rotational centers of the flanges 23 and 24. The flanges 23 and 24 have circumferential lips 39 and 40, which protrude toward each other to cover the outermost convolution of the roll of the filmstrip 14 when the flanges 23 and 24 are mounted on the spool core 22. This construction prevents the film roll from loosening, and permits transmitting rotational movement of the spool core 22 to the outermost convolution of the film roll.

The flange 24 has four semi-circular slots 41 formed at equal intervals around the round hole 38. The ratchet claws 34 of the indication ring 26 are inserted in the slots 41 such that, while the spool core 22 rotates in a winding direction, the ratchet claws 34 slide over one end of the respective slots 41 to let the spool core 22 rotate separately from the flanges 23 and 24. Accordingly, the filmstrip 14 being wound is slid along the lips 39 and 40 of the flanges 23 and 24 while being confined in its lateral direction by the flanges 23 and 24.

Figure 3:
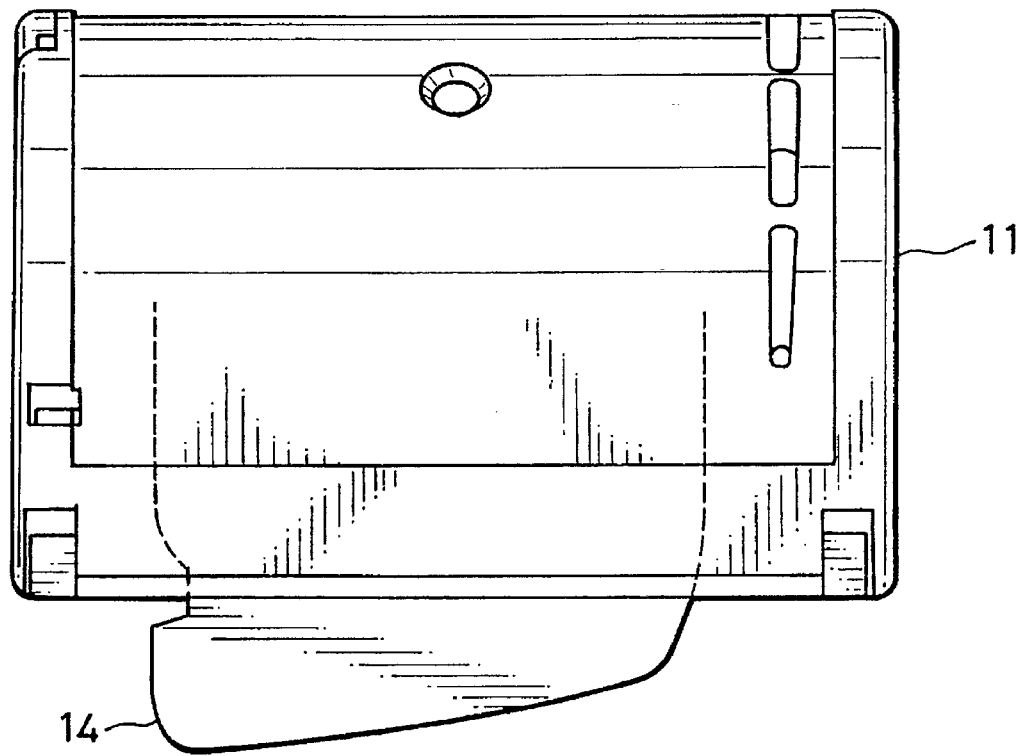
FIG. 3 is a top plan view of the film cassette shown in FIG. 1.
Figure 4:
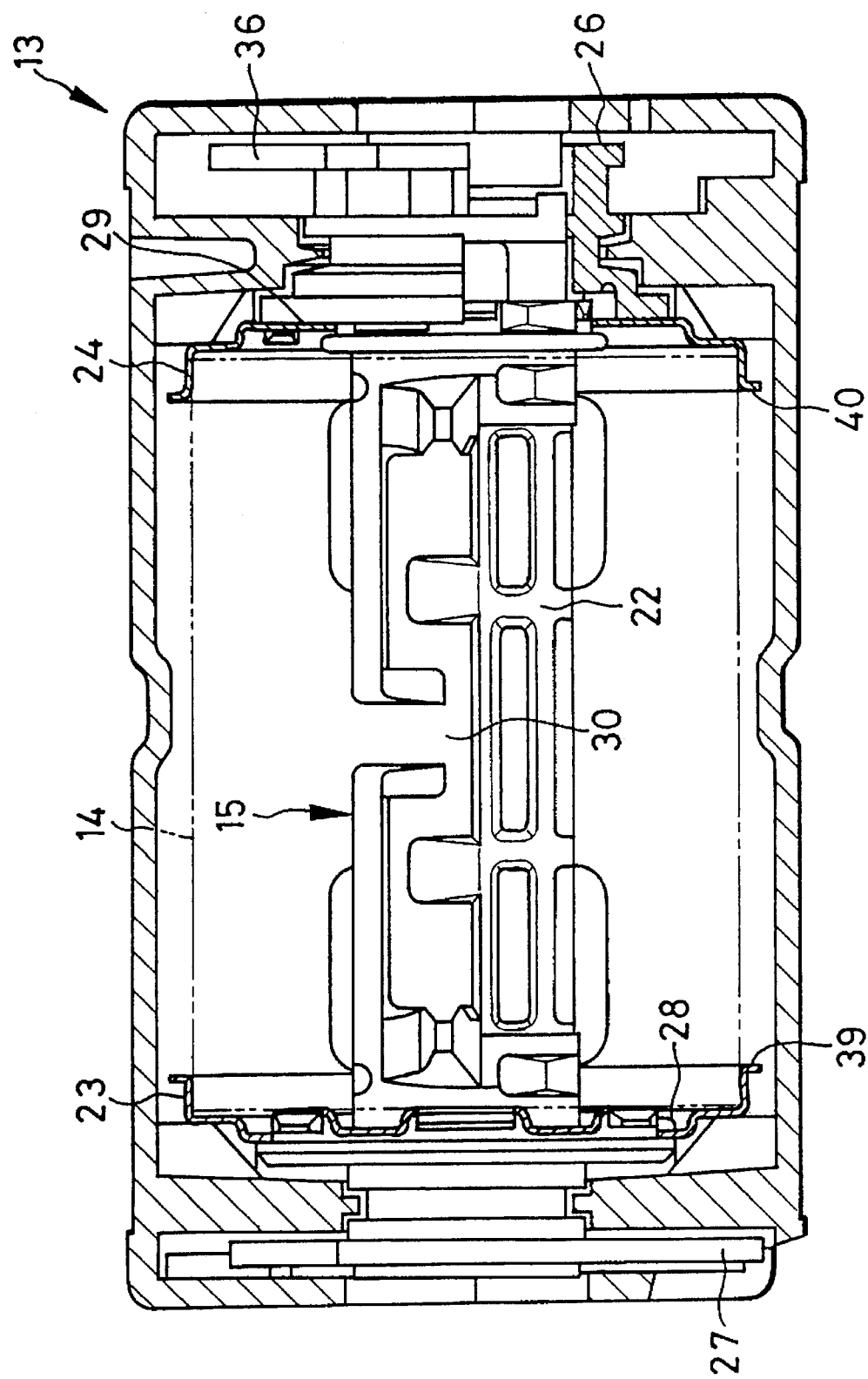
FIG. 4 is a front view of a spool contained in the film cassette of FIG. 1.

When the spool core 22 rotates in a film advancing direction reverse to the winding direction, the ratchet claws 34 engage with the other end of the respective slots 41 to rotate the flange 24 with the spool core 22. Then the roll of filmstrip 14 is rotated together with the spool core 22. As a result, a film leader is separated by the separation claw 19 from the roll. Further rotation of the spool 15 in the film advancing direction makes the film leader push aside the elastic flanges 23 and 24 to release the filmstrip 14 from confinement of the lips 39 and 40. Thus, the filmstrip 14 is allowed to be advanced through the passage slot 17 to the outside of the cassette shell 13, as is shown in FIG. 3.

Figure 5:
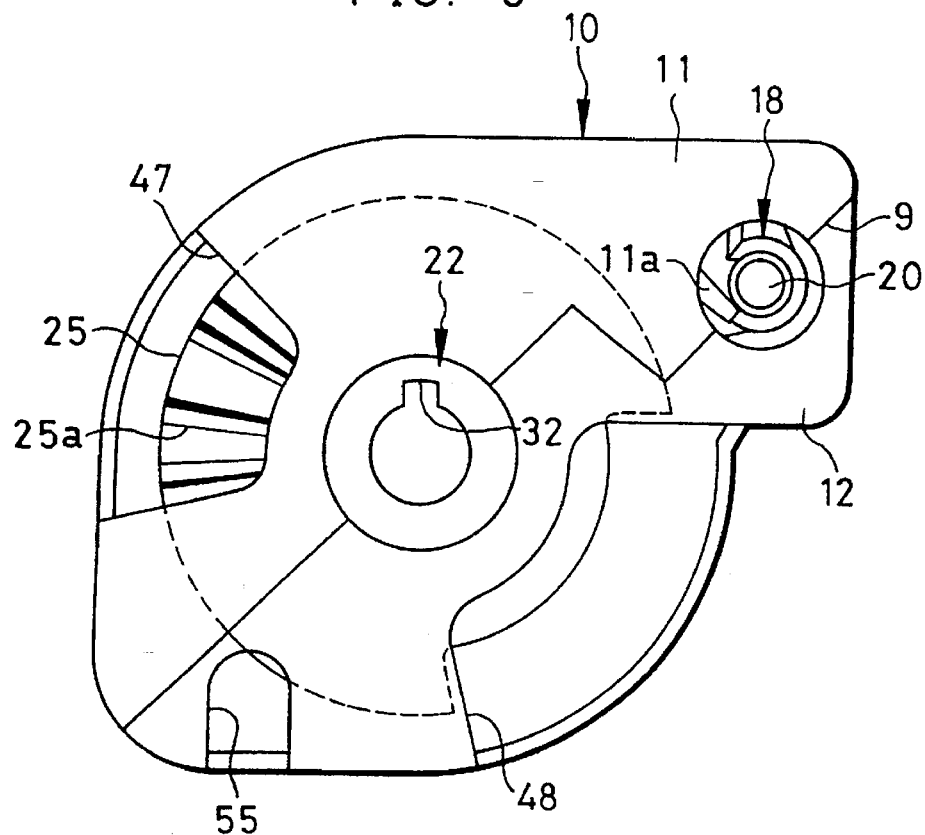
FIG. 5 is a left side view of the film cassette of FIG. 1.
Figure 6:
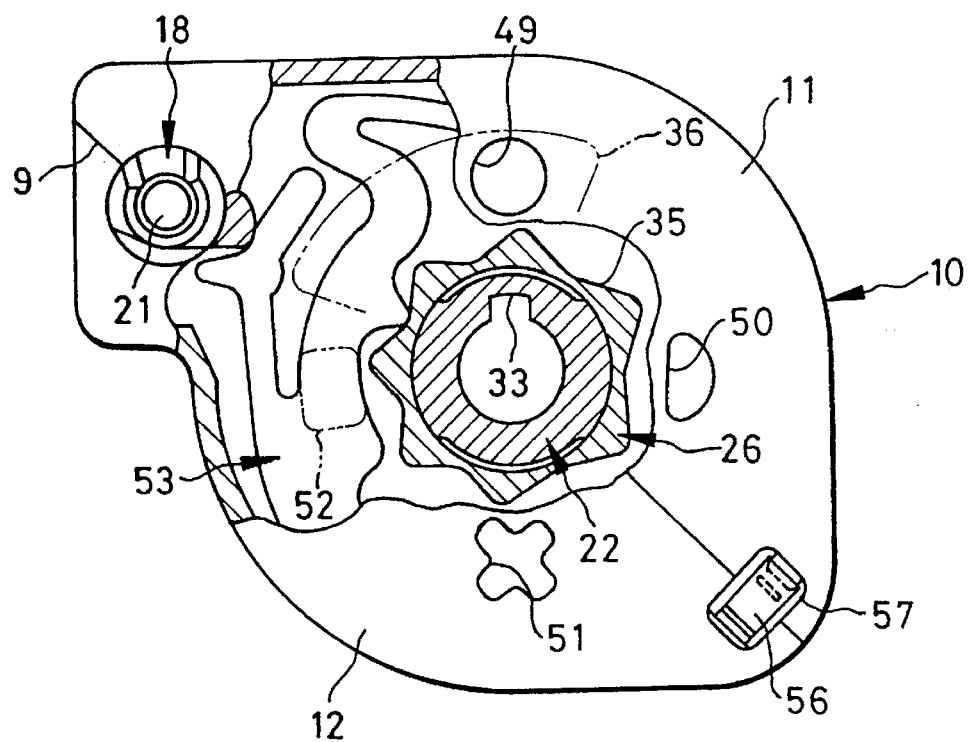
FIG. 6 is a right side view, partly broken away, of the film cassette of FIG. 1.
Figure 7:
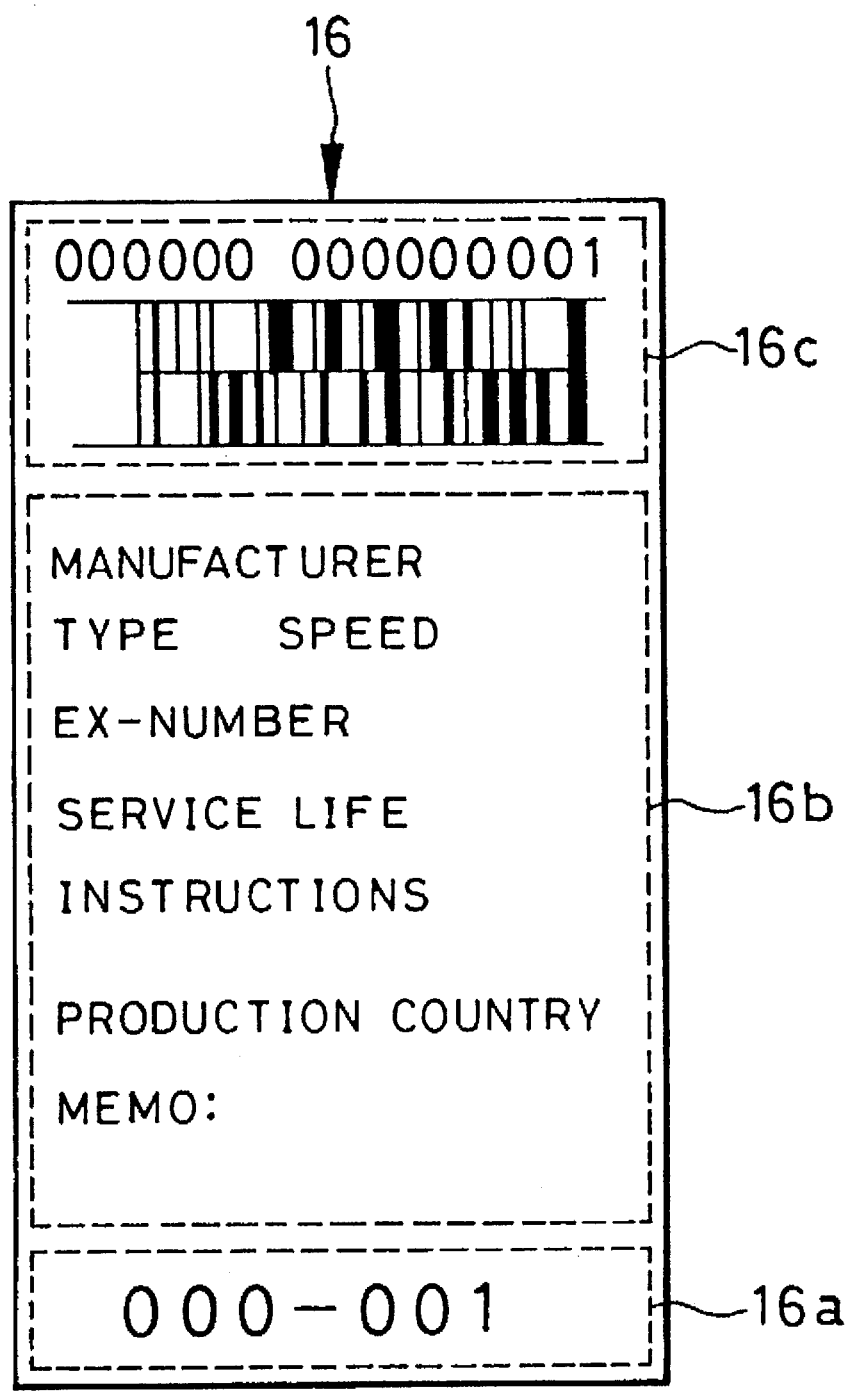
FIG. 7 is an explanatory view of an example of shell label.

The data disc 27 has a sector portion 43 and a smaller radius portion 44. The bar code label 25 has a corresponding shape to the data disc 27. The bar code label 25 has bar codes 25a printed thereon to represent various data such as the type of the photo filmstrip 14. As shown in FIG. 5, the bar codes 25a are read by a sensor of the camera through an opening 47 formed through an end face portion of the one shell half 11, hereinafter called the upper shell half, while the spool 15 is rotated in the film advancing direction. The bar code data is used for calculating an exposure value, for setting the number of available exposure frames in a frame number counter of the camera, and so forth.

Since the filmstrip 14 is entirely contained in the cassette shell 13 before and after exposure, it is hard to discriminate from appearance between unused and used cassettes. To prevent a used film cassette 10 from being loaded again in the camera, an anti-reuse opening 48 is formed through the other, i.e. lower shell half 12 in the same side as the opening 47. The anti-reuse opening 48 is disposed in opposition to a lever mounted inside a cassette chamber of the camera.

When the film cassette 10 is unused, the sector portion 43 of the data disc 27 is exposed through the anti-reuse opening 48. After the film cassette 10 is loaded and exposed in the camera, the drive shafts of the camera rotates the spool 15 to displace the sector portion 43 out of the opening 48, as is shown in FIG. 5. Therefore, the camera can distinguish used film cassettes 10 from unused ones with reference to the rotational position of the lever in the cassette chamber.

A film speed indication notch 55 may be formed in the same side as the openings 47 and 48, for enabling cameras that have no bar code sensor to determine the film speed of the loaded film cassette 10 without reading the bar codes 25a. That is, the film speed indication notch 55 is formed in the film cassette 10 when the contained filmstrip 14 is of ISO-400 or more.

To allow the user to visually know what stage the film cassette 10 is present, cut-outs 49, 50, 51 and 52 are formed through the opposite side of the film cassette 10 from the openings 47 and 48. The cut-out 49 is designated to effect an indication that the filmstrip 14 is unexposed. The cut-out 50 is designated to effect an indication that the filmstrip 14 is partly exposed. The cut-out 51 is designated to effect an indication that the filmstrip 14 is fully exposed. The cut-out 52 is designated to effect an indication that the filmstrip 14 has been processed to develop the image. For the respective indication, the spool 15 is rotated to position the indication flag 36 behind one of the cut-outs 49 to 52.

Also a tab 56 is provided in the same side as the cut-outs 49 to 52 for allowing the camera or a film processor to automatically determine whether the filmstrip 14 is developed or not. The tab 56 is formed to be torn off from a cut-out 57 when the contained filmstrip 14 has been developed.

The upper and lower shell halves 11 and 12, the spool core 22 and the door 18 are each formed by injection molding using a high impact polystyrene resin (Denka Styrole HI-R-Q: Denki Kagaku Kogyo K. K.) mixed with 1.0 wt% carbon black (Mitsubishi Carbon Black #950: Mitsubishi Chemical Industries, Ltd.) as a light screen, and 1.5 wt% silicon oil (Shin-etsu Silicon KF96H—30,000 cs in viscosity: Shin-etsu Chemical Industries Co.) as a lubricant. The indication ring 26 is formed by injection molding using the above mentioned high impact polystyrene resin mixed with the above mentioned carbon black of 0.01 wt% and titanium oxide (CR60-2: Ishihara Sangyo Kaisha, Ltd.) of 3.5 wt%.

The flanges 23 and 24 are each formed by vacuum and pressure forming from a 150 μm film of polymer alloy composed of polystyrene resin and polyphenylene ether resin (ZAIRON X9101: Asahi Kasei).

The shell label 16 is made as follows: a 50 μm thick polystyrene film containing white pigment is provided on its one surface with coating for imparting printability thereto, and on its other surface with adhesive. A consequent raw sticker with release backing paper is provided with a space 16a for printing an ID number on a respective film cassette 10, a film type printing space 16b for printing the name of article, the name of manufacturer, the film type, the film speed, the number of available exposures, and instructions and for writing a user's memo, as well as a bar code printing space 16c. After printing in the film type printing space 16b, the raw sticker is cut halfway, and then bar codes and the ID numbers are printed in the spaces 16c and 16a. The shell labels 16 are sequentially pealed off the releasing paper. The bar codes may represent the name of manufacturer, the lot number, the date of manufacture, the film type, the film speed, the number of available exposures, the cassette ID number and so forth.

The bar code label 25 is made by vapor-depositing an aluminum layer of about 400Å thick on one surface of a 50 μm thick transparent polystyrene film, putting an adhesive over the aluminum layer, and putting a releasing paper on the adhesive, thereby providing a sticker with releasable backing paper. The bar codes are printed on the opposite surface of the sticker from the aluminum layer. Thereafter, the sticker is cut halfway along the respective circumferences of the bar code labels 25, and holes are punched through the respective centers of the labels 25.

As shown in FIGS. 1, 8, 9A and 9B, the shell halves 11 and 12 are securely mated to each other through snap-in engagement between resilient hooks 59 and not-shown retaining portions as well as between resilient hooks 60 and retaining portions 61. The hooks 59 and 60 are formed integrally with the lower shell half 12, whereas the retaining portions are formed integrally with the upper shell half 11. A fastener 62 constituted of the hook 60 and the retaining portion 61 is disposed on each side of the passage slot 17 for fastening the front joint 9 and the joints in the end faces of the cassette shell 13. All joint surfaces of the cassette shell 13 have labyrinth structures to make the interior of the shell 13 light-tight when the shell halves 11 and 12 are mated and secured to each other.

The retaining portion 61 has a crest 63 and a trough or engaging surface 64, whereas the hook 60 is so shaped as to resiliently pass over the crest 63 to be pushed against the engaging surface 64. The hook 60 may be removably engaged with the retaining portion 61.

Figure 10:
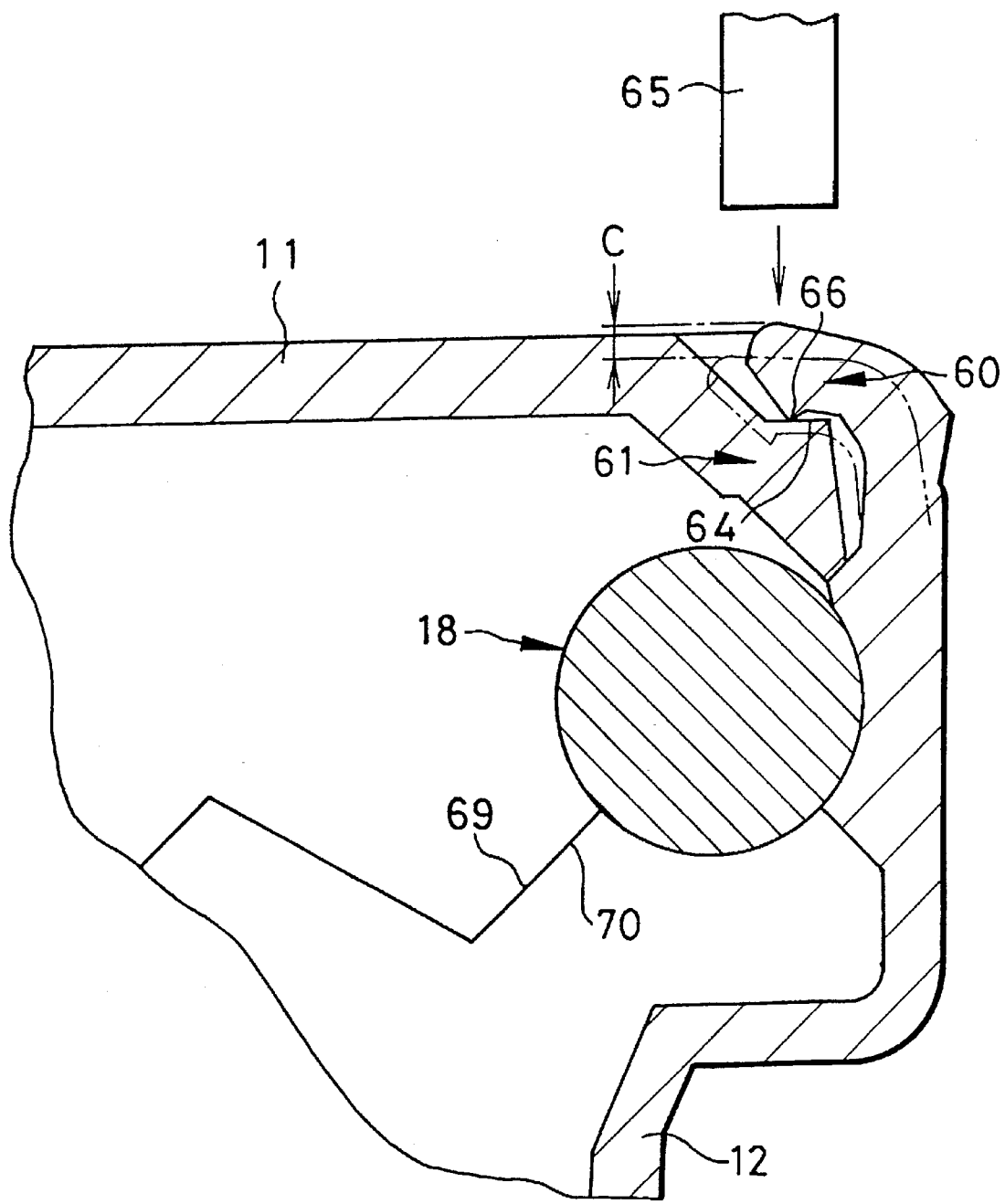
FIG. 10 is an explanatory sectional view illustrating an engaged position of the hook of the first embodiment in relation to its initial position.
Figure 11:
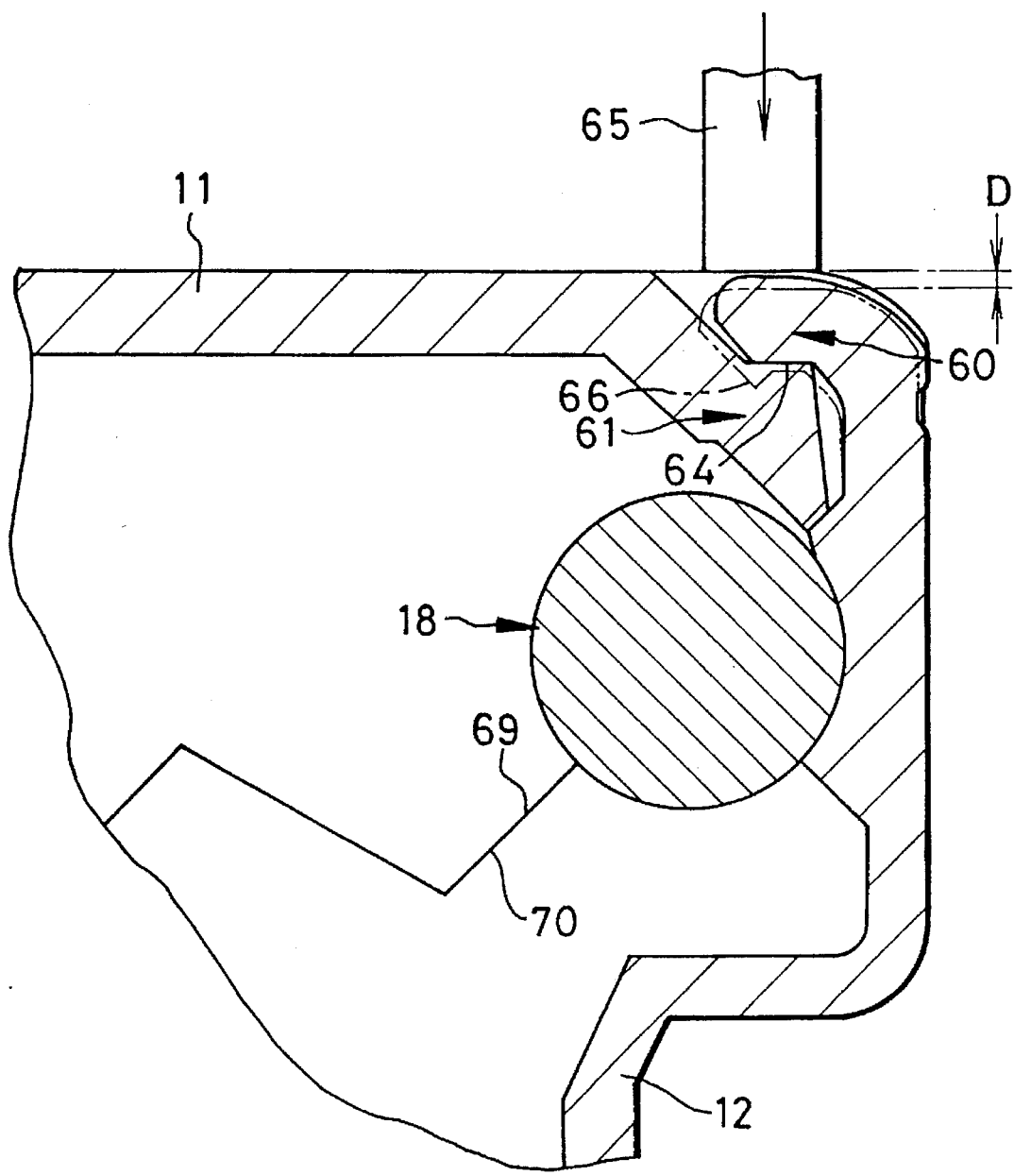
FIG. 11 is an explanatory sectional view illustrating a welded position of the hook of the first embodiment in relation to its initial position.

Alternatively, the hook 60 and the retaining portion 61 can be secured to each other by ultrasonic welding, as is shown in FIGS. 10 and 11. For ultrasonic welding, at least an energy director 66 is provided in form of a small triangular boss on contact surfaces of the hook 60 with the retaining portion 61, and/or on the engaging surface 64 of the retaining portion 61. The energy director 66 is melted to weld the hook 60 and the retaining portion 61 together, sealing a gap therebetween.

The welding is carried out by pressing an ultrasonic horn 65 onto the hook 60 at its outer portion opposite to the engaging surface 64 after the hook 60 is engaged with the retaining portion 61, such that the pressure being applied in a direction orthogonal to the engaging surface 64. The ultrasonic horn 65 emits ultrasonic waves while being moved in the orthogonal direction to a predetermined pressing position. When the ultrasonic horn 65 reaches the predetermined pressing position, it terminates oscillating.

It is preferable to effect the welding in a final stage of manufacture after the film cassette 10 is checked out, so that the film strip 14 may be removed from the film cassette 10 if it is disqualified. Since the fasteners 62 can be easily disengaged by resiliently bending the hooks 60, it is possible to utilize the fasteners 62 for temporary mating the shell halves 11 and 12 so as to permit handling them as a unit during manufacturing.

For the triangular energy director 66, it is preferable to press the horn 65 onto the hook 60 at a pressure from 120 kPa to 150 kPa. The oscillation time is from 40 ms to 200 ms, preferably from 50 ms to 150 ms. After the oscillation is terminated in the predetermined pressing position, the horn 65 is held in this pressing position for a time from 40 ms to 200 ms, preferably from 50 ms to 150 ms. If either the oscillation time or the holding time is less than 40 ms, the welding maybe unreliable. More than 200 ms of oscillation time or holding time tends to deform the fastener 62.

As shown in FIG. 8, the joints in each end face of the cassette shell 13 are constituted of a pair of straight joint surfaces 67 and 68 extending in a radial direction to the spool core 22, a pair of straight joint surfaces 69 and 70 extending in a radial direction to a rotational axis of the door 18 in parallel to the surfaces 67 and 68, and a pair of straight joint surfaces 71 and 72 which are oblique to the surfaces 67 to 70. The oblique upper and lower joint surfaces 71 and 72 connect the upper joint surfaces 67 and 69, and the lower joint surfaces 68 and 70, respectively. The oblique joint surfaces 71 and 72 are inclined such that the upper shell half 11 can be separated vertically upward from the lower shell half 12 when the joint surfaces 67 to 70 are oriented horizontal.

Because the joint surfaces 67 to 72 are straight, it is desirable for tight juncture of the respective joint surface pairs to apply pressure in respective orthogonal directions to the joint surface pairs. That is, a direction shown by an arrow 73 for the joint surface pairs 67 and 68; 69 and 70, and a direction shown by an arrow 74 for the joint surface pair 71 and 72. Since the joint surface pair 71 and 72 are oblique to the joint surfaces 67 to 70, the direction 74 to the joint surfaces 71 and 72 is oblique to the direction 73. Therefore, it is preferable for the sake of tightness of all the joint surface pairs 67 to 72 to design the hooks 60 so as to press the retaining portions 61 in a direction shown by an arrow 75 that represents a half of an acute angle formed between the directions 73 and 74.

The pressing direction of the hook 60 can be defined as an inclination angle $\theta1$ relative to the vertical direction when the joint surfaces 67 to 70 are oriented horizontal, wherein the inclination angle $\theta1$ may be about half the acute angle formed between the directions 73 and 74.

FIG. 12 shows results of drop tests of various samples of the above-described film cassette having the above-described construction but differently dimensioned hooks 60. Each sample was dropped ten times from 2 m height to an iron plate. The fastener 62 of every sample was ultrasonically welded. Each sample was inspected after the drop test for defects, such as disengagement, breakage, cracks, in and deterioration of light-tightness. The hooks 60 of the respective samples were changed in thickness T (see FIG. 9B) and in the amount of displacement D of a welded position from an initial or preengaged position shown by phantom lines in FIG. 11.

In FIG. 12, "OK" indicates that the associated film cassette 10 suffered no damage from the drop test and held its light-tightness. "NG" indicates that the associated film cassette 10 suffered some damage. With respect to the amount of displacement D, positive values represent that the welded position of the respective hooks 60 were displaced in a direction away from the retaining portions 61 relative to the initial position which is shown by virtual lines in FIGS. 10 and 11. On the other hand, negative values represent that the welded position of the respective hooks 60 were displaced relative to the initial position in a direction close to the retaining portions 61.

According to the drop tests, those film cassettes whose hooks 60 were designed to be displaced in the positive range from D=0 mm to 0.5 mm were concluded to be good, except a case where the displacement D was 0.5 mm and the thickness T was 1.5 mm. In this case, a plastic deformation of the hook 60 was caused by force-fitting, and the hook 60 cracked in the drop test.

All of those film cassettes which were designated to have negative displacement values of the hook 60, D=-0.1 mm to -0.5 mm, were disqualified because gaps were provided in the joints between the shell halves 11 and 12 when the fasteners 62 were welded. This is because the upper shell half 11 was pulled up toward the hooks 60 by welding. Moreover, in those cases bounded by chain-dotted lines in FIG. 12, the hooks 60 were plastically deformed.

In view of the above drop tests and other tests, it was found that the film cassette 10 shown in FIGS. 1 to 11 should be dimensioned as follows:

1) Width W of the hook 60 (see FIG. 9C) is preferably from 0.5 mm to 4 mm, and more preferably from 1 mm to 3 mm. Below this range, the hook 60 is difficult to form and too weak. Above this range, the hook 60 is also difficult to form, the cassette shell 13 is enlarged, and the force necessary for joining the shell halves 11 and 12 is too large.

2) Thickness T of the hook 60 is preferably from 0.3 mm to 2 mm, and more preferably from 0.5 mm to 1.5 mm. Below this range, the hook 60 is uneasy to form and too weak. Above this range, the hook 60 is also uneasy to form, the cassette shell 13 is enlarged, and the force necessary for joining the shell halves 11 and 12 is too large.

3) Height H of a distal end of an inner surface of the hook 60, or a tip of the energy director 66 if the energy director 66 is provided in the inner surface, the inner surface being brought into contact with the engaging surface 64 of the retaining portion 61, with respect to a base of the hook 60 that is aligned with the straight joint surface 70, as is shown in FIG. 9B, is preferably from 0.5 mm to 3 mm, and more preferably from 0.8 mm to 2 mm. Below this range, the force necessary for joining the shell halves 11 and 12 is too large. Above this range, the hook 60 is so elastic or flexible as to permit providing a gap at the joint between the shell halves 11 and 12 for a moment when the film cassette 10 drops down.

4) Depth of engagement A, defined by a distance between the distal end and a center of the base of the hook 60, is preferably from 0 mm to 1 mm, and more preferably from 0 mm to 0.8 mm. Above this range, the hook 60 is so elastic or flexible as to permit providing a gap at the joint between the shell halves 11 and 12 for a moment when the film cassette 10 drops down.

5) The amount B of resilient bending of the hook 60 to get over the crest 63 of the retaining portion 61, is preferably from 0.3 mm to 1.1 mm, and more preferably from 0.5 mm to 0.9 mm. Below this range, the hook 60 is too easy to disengage. Above this range, the force necessary for joining the shell halves 11 and 12 is too large, and a plastic deformation occurs in the hook 60 to reduce its strength.

6) Angle $\theta3$ of the oblique joint surfaces 71 and 72 to the joint surfaces 69 and 70 is preferably from 15° to 90°, and more preferably from 45° to 90°. Below this range, positioning effect for the shell halves 11 and 12 in a direction parallel to the joint surfaces 67 to 70 is reduced. Above this range, the upper shell half 11 cannot be mated with the lower shell half 12 in a direction perpendicular to the joint surfaces 67 to 70.

7) Angle $\theta2$ of the engaging surface 64 of the retaining portion 61 to the joint surface 69 is preferably $0° \leq \theta2 \leq \theta3$, and more preferably $5° \leq \theta2 \leq \theta3-5°$, for achieving light-tightness of the front and side joints of the cassette shell 13.

8) The amount of displacement C of the engaged position of the hook 60 shown by the solid line in FIG. 10 relative to the initial or preengaged position thereof shown by virtual lines in FIG. 10, is preferably from 0.1 mm to 1.5 mm, and more preferably from 0.2 mm to 1.5 mm. Below this range, the pressure applied from the hook 60 onto the retaining portion 61 is too small. Above this range, the force necessary for joining the shell halves 11 and 12 is too large, and a plastic deformation occurs in the hook 60 to reduce its strength.

9) The amount of displacement D of the welded position of the hook 60 shown by the solid line in FIG. 11 relative to the initial or preengaged position thereof shown by virtual lines in FIG. 11, is preferably from 0.05 mm to 1 mm, and more preferably from 0.1 mm to 0.8 mm. Below this range, the pressure applied from the hook 60 onto the retaining portion 61 is too small. Above this range, the volume melted by the ultrasonic welding is so reduced that the strength is insufficient.

10) Spring constant of the hook 60 in the pressing direction toward the retaining portion 61 is preferably from 0.1 Kgf/mm to 4 Kgf/mm, and more preferably from 0.3 Kgf/mm to 2.5 Kgf/mm. Below this range, the pressure applied from the hook 60 onto the retaining portion 61 is too small. Above this range, the force necessary for joining the shell halves 11 and 12 is too large.

Figure 13:
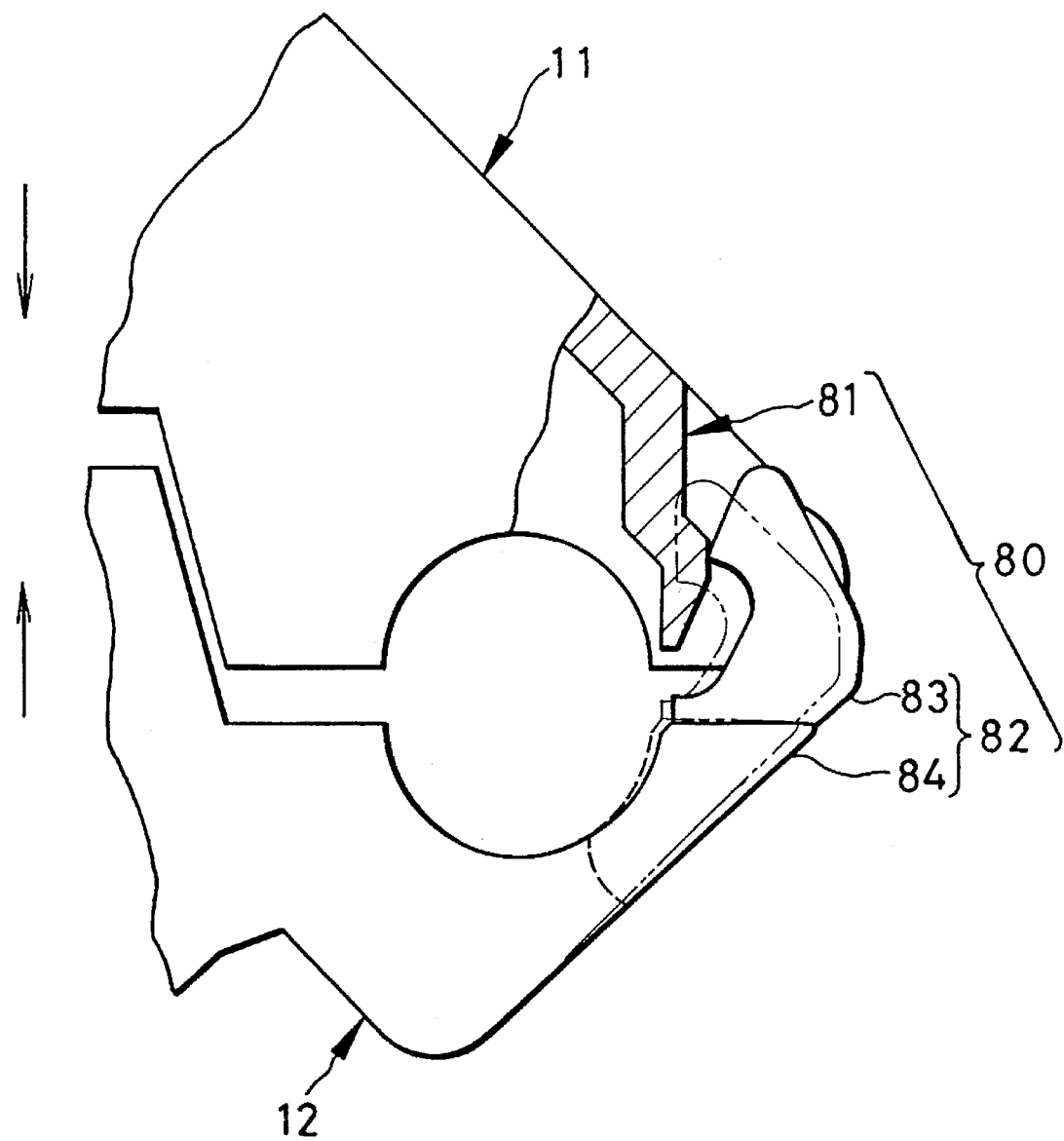
FIG. 13 is a fragmentary side view, partly in section, illustrating a fastener and joint surfaces between the shell halves, according to a second embodiment.

A second embodiment of the invention will be described with reference to FIGS. 13 to 18, wherein same or like parts are designated by the same reference numbers as in FIGS. 1 to 12. As shown in FIG. 13, the front joint between the shell halves 11 and 12 is secured by fasteners 80, which are disposed on opposite sides of the passage slot, and each of which is constituted of a stepped portion 81 and a hook portion 82. The stepped portion 81 is integrally formed with the upper shell half 11. The hook portion 82 is integrally formed with the lower shell half 12, and includes a hook 83 and a stem 84 which are resiliently bent when mating the shell halves 11 and 12 together, as is shown by phantom lines in FIG. 13.

Figures 15A, 15B, 15C:
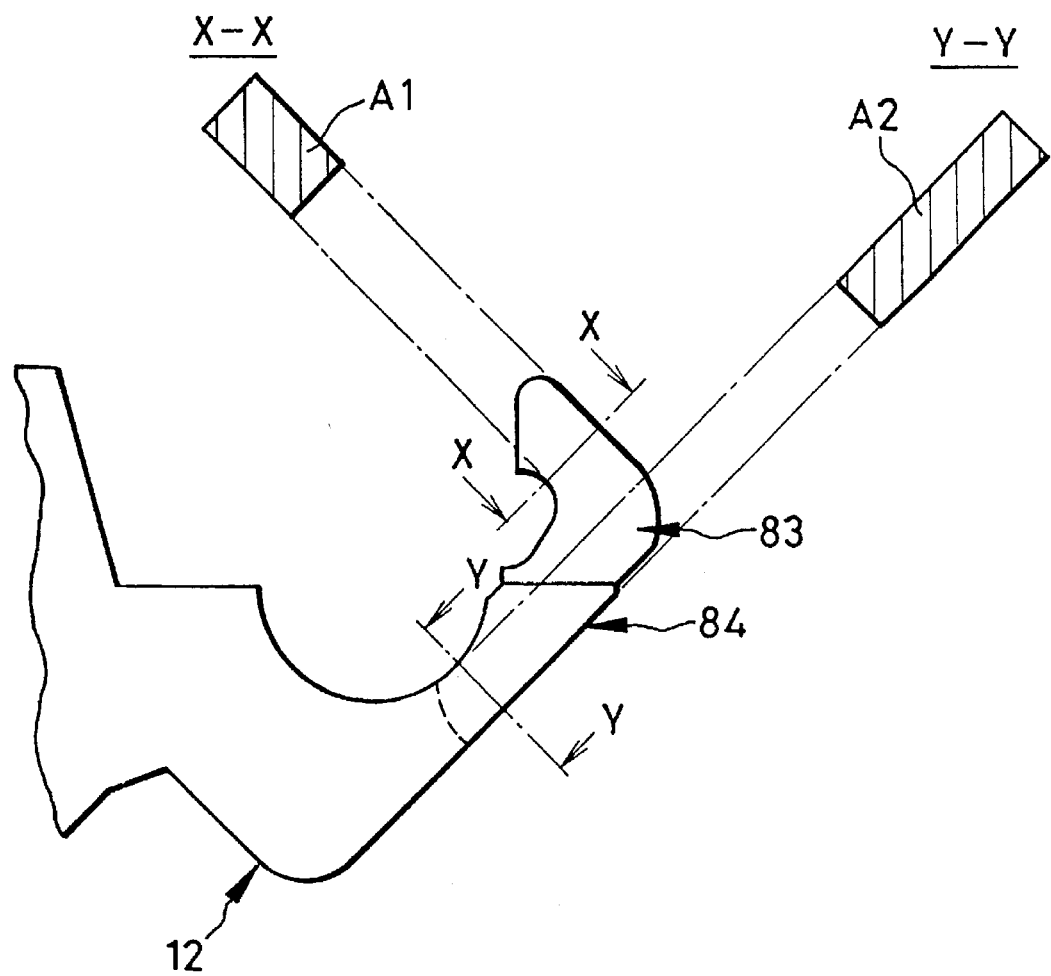
FIG. 15A is a fragmentary side view of the hook portion of the second embodiment.
FIG. 15B is a sectional view taken along line X—X of FIG. 15A.
FIG. 15C is a sectional view taken along line Y—Y of FIG. 15A.

Referring to FIGS. 14A, 14B, 14C and 14D illustrating the fastener 80 viewed from various directions, the hook portion 82 is shaped such that a minimum thickness $T_{min}$ of the hook 83 is not less than a minimum thickness $F_{min}$ of the stem 84, and that $A1/A2 \geq 0.4$ wherein A1 represents a cross-sectional area of the hook 83 in its thinnest portion (see FIG. 15B), that is taken along line X—X of FIG. 15A, and A2 represents a cross-sectional area of the stem 84 in its thinnest portion (see FIG. 15C), that is taken along line Y—Y of FIG. 15A.

As shown in FIG. 16A, where the hook portion 82 is engaged with the stepped portion 81, the hook 83 contacts the stepped portion 81 at two surfaces, while being urged toward the stepped portion 81. Therefore, the joints between the shell halves 11 and 12 are kept light-tight.

To secure the engagement between the stepped portion 81 and the hook portion 82, it is possible to apply ultrasonic welding to the fasteners 80 in the same way as the first embodiment. In that case, the pressing direction of an ultrasonic horn 88 to the upper shell half 11 should preferably have an angle θ4 of about 45° relative to the joint surfaces 69 and 70. It is desirable to dispose a base member 89 under the lower shell half during welding, for supporting the cassette shell 13 so that the ultrasonic horn 88 may press the hook 83 in a vertical direction while maintaining an outer surface of the hook 83 substantially horizontal. Since the hook 83 contacts the stepped portion 81 at two portions, i.e., at upper and lower tips 83a and 83b of its distal end, these tips 83a and 83b are melted to weld onto the stepped portion 81 when the hook 83 is pressed by the ultrasonic horn 88.

Since the stem 84 is designed to be thinner than the hook 83, and thus the thinnest portion of the stem 84 is less stiff than the hook 83, the stem 84 as well as the hook 83 are resiliently bent around the respective thinnest portions when clicking the hook portion 82 on the stepped portion. Accordingly, the hook 83 and the stem 84 each only need to be bent or resiliently deformed by smaller amounts, compared with a case where only one of them is bent. Correspondingly, the loads on the bent portions of the hook 83 and 84 are reduced.

It is to be noted that the stiffness or spring constant of the hook 83 in the pressing direction toward the stepped portion 81 is preferably from 3 Kgf/mm to 10 Kgf/mm, whereas stiffness of the stem 84 is preferably from 2 Kgf/mm to 13 Kgf/mm. A total stiffness of the hook 83 and the stem 84, i.e. stiffness of the hook portion 82 is preferably from 0.5 Kgf/mm to 4 Kgf/mm. Below this range, the pressure onto the stepped portion 81 is too small. Above this range, the force necessary for joining the shell halves 11 and 12 is too large. To set the stiffness in the above range, it is preferable to form the shell halves 11 and 12 from a resin having a Young's modulus of elasticity 150 Kgf/mm² to 500 Kgf/mm².

Figure 17:
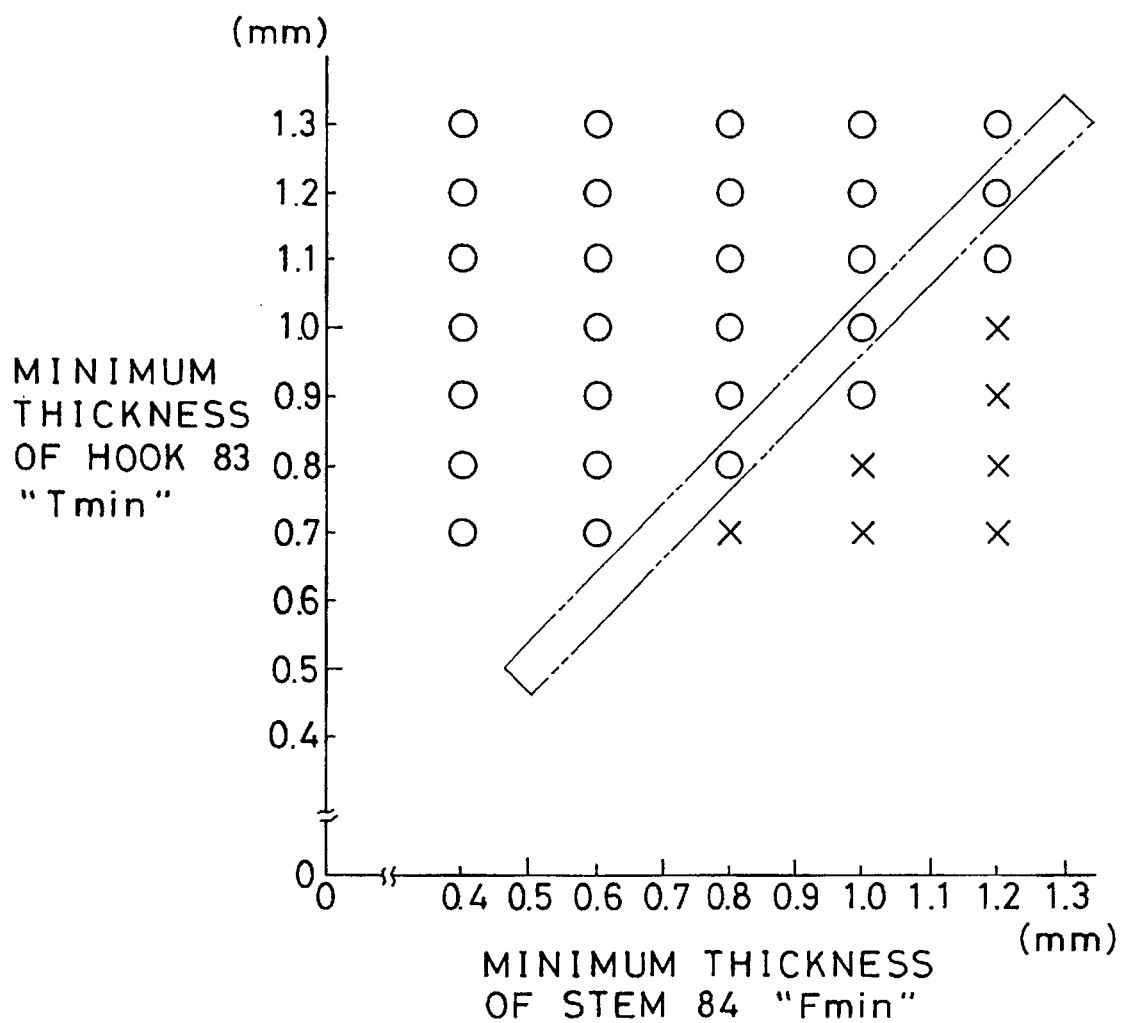
FIG. 17 is a graph illustrating results of drop tests using samples having the hook portions of the second embodiment, wherein minimum thicknesses of the hook and stem are different from one sample another.

FIG. 17 shows results of drop tests of various samples of film cassettes having the above-described fasteners 80, wherein the minimum thicknesses $T_{min}$ and $F_{min}$ of the hook 83 and the stem 84 are differently dimensioned. Each sample was dropped ten times from a 2 m height down to an iron plate. The fasteners 80 of every test sample were welded by ultrasonic waves. Each sample after the drop test was inspected damage in the fasteners 80, such as disengagement, break, cracks, deterioration of the light-tightness of the joints between the shell halves 11 and 12.

In FIG. 17, "O" indicates that the associated sample suffered no malfunction from the drop test and held its light-tightness. "X" indicates that the associated sample suffered some damage. Those samples where the minimum thickness $T_{min}$ is equal to $F_{min}$ are bounded by chain-dotted lines.

According to the results of drop tests, those samples where $T_{min}$ is not less than $F_{min}$ were concluded to be good. On the contrary, in those samples where $T_{min}$ is less than $F_{min}$, the hook portions 82 were plastically deformed and cracked at the portions bent when force-fitting the hook portions 82 to join the shell halves 11 and 12. In conclusion, the fasteners 80 can stand up to the impact of dropping so far as the hook 83 and the stem 84 satisfy the condition $T_{min} \geq F_{min}$.

Figure 18:
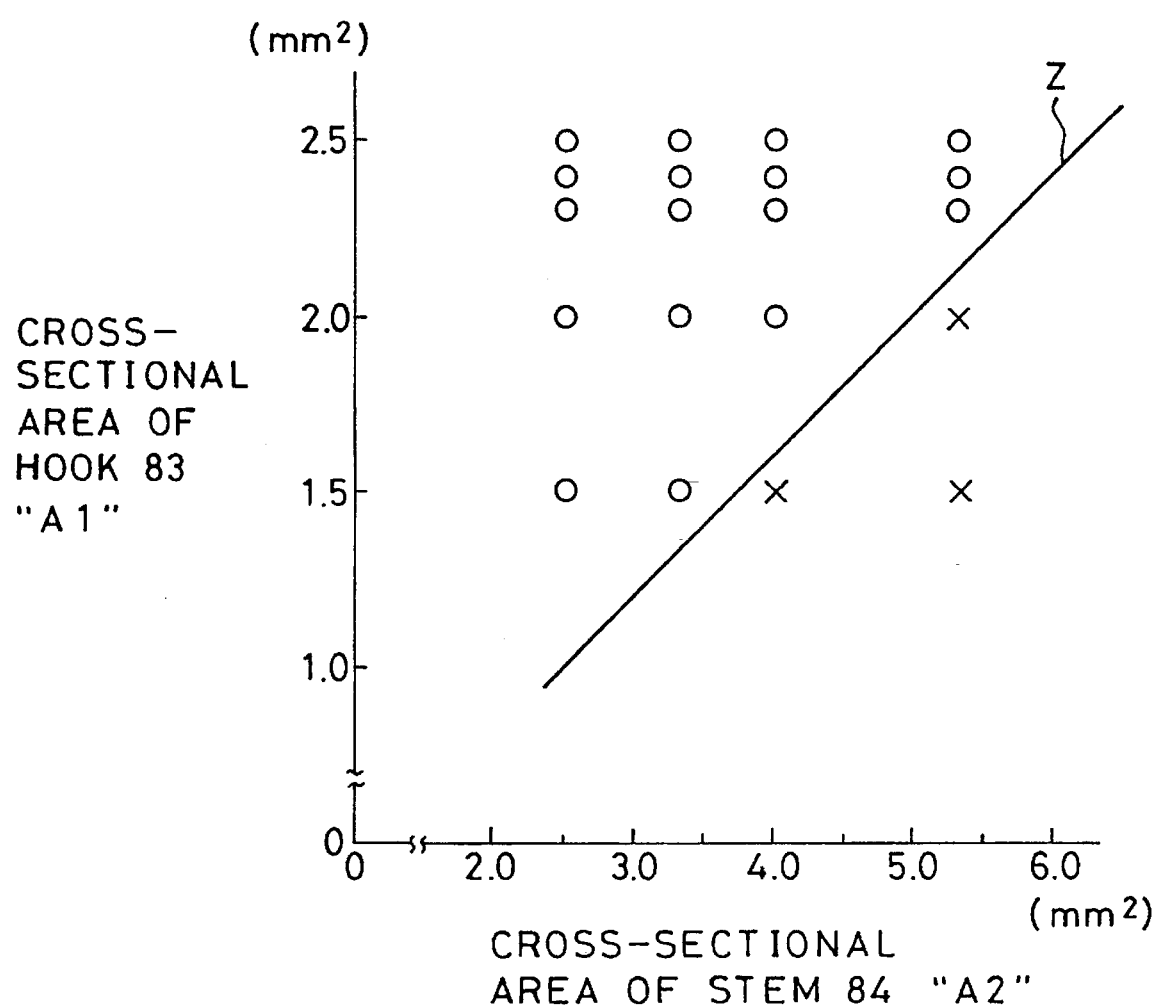
FIG. 18 is a graph illustrating results of drop tests using samples having the hook portions of the second embodiment, wherein cross-sectional areas of the thinnest portions of the hook and stem are different from one sample another.

FIG. 18 shows results of drop tests of various samples of film cassettes having the above-described fasteners 80, wherein the cross-sectional areas A1 and A2 of the hook 83 and the stem 84 are differently dimensioned. Each sample was tested in the same way as above, and was inspected for damage in the fasteners 80, and deterioration of the light-tightness of the joints between the shell halves 11 and 12. Also in FIG. 18, "O" indicates that the associated sample suffered no malfunction from the drop test and held its light-tightness. "X" indicates that the associated sample suffered some damage. For reference, a border line Z representing A1/A2=0.4 is drawn in the graph of FIG. 18.

As seen from the graph, in the range of $A1/A2 \geq 0.4$, that corresponds to an upper left range from the border line Z, the samples were not damaged at all. On the contrary, all the samples belonging to the range of A1/A2<0.4, that corresponds a lower right range from the line Z, were found to be damaged. In conclusion, the fasteners 80 can stand up to the impact of dropping if the hook 83 and the stem 84 satisfy the condition $A1/A2 \geq 0.4$.

In view of the above drop tests and other tests, it is preferable for the fastener 80 of the second embodiment shown in FIGS. 13 to 16 to have dimensions as follows, wherein, as for those dimensions which are designated by the same reference characters T, W, H and so forth as in the first embodiment, the same conditions or ranges as mentioned with respect to the first embodiment are preferably applicable to the second embodiment:

1) Minimum thickness $T_{min}$ of the hook 83 is preferably from 0.3 mm to 2 mm, and more preferably from 0.5 mm to 1.5 mm. Below this range, the hook 83 is uneasy to form and too weak. Above this range, the hook 83 is also uneasy to form, and the stiffness of the hook 83 is so large that the hook portion 82 tends to be plastically deformed. It is to be noted that "T" designates a maximum thickness of the hook 83 in FIG. 14B.

2) Inclination angle θ5 of one side of the hook 83 toward the other side (see FIG. 14C) is preferably from 0.5° to 10°, and more preferably from 1° to 8°. Below this range, the hook 83 is hard to remove from the mold, and its strength is insufficient. Above this range, the strength is also insufficient because of a too slim distal end.

3) Cross-sectional area A1 of the thinnest portion of the hook 83 is preferably from 2 $mm^2$ to 10 $mm^2$, and more preferably from 4 $mm^2$ to 8 $mm^2$. Below this range, the hook 83 is hard to remove from the mold, and its strength is insufficient. Above this range, the hook 83 is also difficult to form, and the stiffness is so large that the hook portion 82 tends to be plastically deformed.

4) Minimum thickness $F_{min}$ of the stem 84 is preferably from 0.3 mm to 1.8 mm, and more preferably from 0.4 mm to 1.2 mm. Below this range, the stem 84 is uneasy to form and too weak. Above this range, the stem 84 is also difficult to form, and the stiffness of the stem 84 is so large that the hook 83 tends to be plastically deformed.

5) Width W of the stem K (see FIG. 14C) is preferably W+0.5 mm≦K≦W+4.5 mm, and more preferably W+1 mm≦K≦W+4 mm, wherein W represents the width of the hook 83. Below this range, its strength is insufficient. Above this range, the stiffness of the stem 84 is so large that the hook 83 tends to be plastically deformed.

6) Cross-sectional area A2 of the thinnest portion of the stem 84 is preferably from 2 $mm^2$ to 5 $mm^2$, and more preferably from 2.5 $mm^2$ to 4.5 $mm^2$. Below this range, its strength is insufficient. Above this range, the stiffness of the stem 84 is so large that the hook 83 tends to be plastically deformed, and the film cassette is to be enlarged.

7) Distance J from a top of the hook 83 to a lower end of the stem 84 is preferably from 3 mm to 8 mm, and more preferably from 4.5 mm to 6.5 mm. Below this range, the stiffness of the stem 84 is so large that the hook 83 tends to be plastically deformed, and the passage slot 17 is too small to let the filmstrip 14 pass safely therethrough. Above this range, the passage slot 17 is too large to reliably shield the interior of the cassette shell 13, and the filmstrip 14 may flutter while being advanced through the slot 17.

8) Distance K from the top of the hook 83 to the thinnest portion of the stem 84 is preferably from 2 mm to 7 mm, and more preferably from 3.5 mm to 5.5 mm. Below this range, it is hard to form the stem 84. Above this range, the stiffness of the stem 84 is so large that the hook 83 tends to be plastically deformed.

9) Distance (J–G) from the thinnest portion to the lower end of the stem 84 is preferably from 0.3 mm to 2.5 mm, and more preferably from 0.4 mm to 2 mm. Below this range, the stiffness of the stem 84 is so large that the hook 83 tends to be plastically deformed. Above this range, it is hard to form the stem 84.

10) Width L of the stepped portion 81 (see FIG. 14D illustrating a top plan view of the stepped portion 81) is preferably W+0.1 mm≦L≦W+1 mm, and more preferably W+0.15 mm≦L≦W+0.5 mm, wherein W represents the width of the hook 83. Below this range, it is necessary to position the upper shell half 11 relative to the lower shell half 12 so accurately that suitability of the cassette shell 13 for assembling is lowered. Above this range, it is difficult to fit the hook 82 on the stepped portion 81 in a correct position.

11) Depth M of the ultrasonic horn 88 is preferably from 1 mm to 4 mm, and more preferably from 1.5 mm to 2.5 mm. Below this range, weldability is lowered. Above this range, the hook 83 can be so much deformed that its shock-resistance is lowered.

12) Width N of the ultrasonic horn 88 is preferably W–1 mm≦N≦W+1 mm, and more preferably W–0.5 mm≦N≦W+0.5 mm. Below this range, weldability is lowered. Above this range, the ultrasonic horn 88 tends to interfere with the upper shell half 11 because of too small play relative to the width of the stepped portion 81.

Although the stem 84 of the second embodiment is thinned over the entire length so that the minimum thickness thereof is made less than the minimum thickness of the hook 83, it is possible to provide a notch 95 in a portion of a stem 94, for example, in an intermediate portion of an outer surface of the stem 94, to make the minimum thickness of the stem 94 less than that of a hook 93, as is shown in FIGS. 19A and 19B.

It is also possible that hooks or hook portions are formed integrally with an upper shell half, whereas stepped or engaging portions are formed integrally with a lower shell half.

Figure 20:
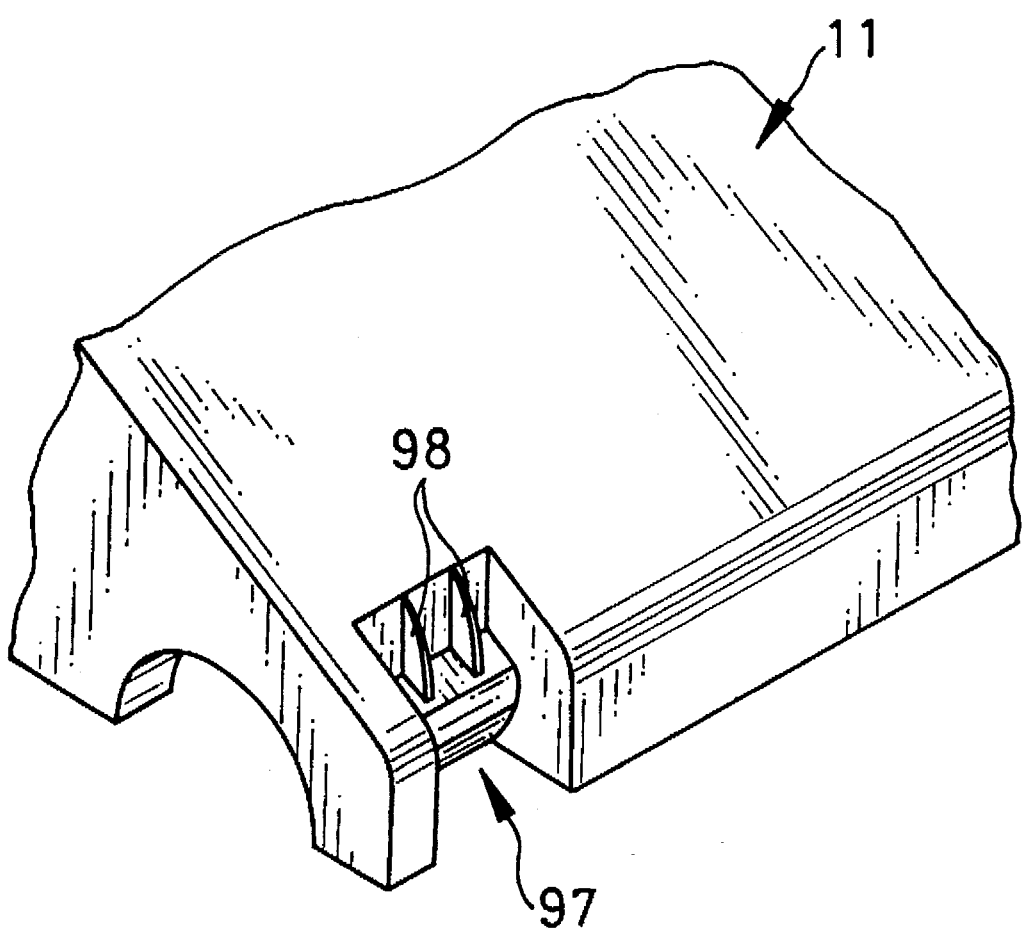
FIG. 20 is a fragmentary perspective view of the upper shell half having a retaining portion which is formed with a couple of energy directors.

It is possible to form a plurality of energy directors 98 on a stepped portion 97 integrally with an upper shell half 11 in a fashion as shown in FIG. 20.

In view of mass-productivity, price and so forth, the resin for forming the cassette shell should preferably be a thermoplastic resin containing carbon black as light screen agent in a percentage from 0.05 wt% to 3.00 wt%. According to necessity, the resin may contain a lubricant such as silicone oil, an antistatic agent, an inorganic or organic pigment such as titanium oxide, a processing aid, an antioxidant, a nucleating agent, and a plasticizer.

Preferred examples of the resin include polystyrene resin, shock-resistant polystyrene resin, styrene-acrylonitrile-copolymer resin, styrene-acrylonitrile-butadiene copolymer resin, polypropylene resin, high density polyethylene resin, polyethylene-terephthalate resin, polycarbonete resin, polyvinyl chloride resin, and modified resin thereof. In view of dimensional accuracy, physical strength, ultrasonic-weldability and other advantages, one of the most preferred examples is shock-resistant polystyrene resin containing 0.1 to 10 wt% synthetic rubber, which has a melt flow rate from 1.0 to 10.0 g/10 sec., preferably from 2.0 to 8.0 g/10 sec., and more preferably from 2.5 to 7 g/10 sec. As other necessary properties of this resin, modulus in flexture is preferably from 15,000 to 30,000 $Kg/cm^2$, more preferably from 18,000 to 28,000 $Kg/cm^2$, and most preferably from 20,000 to 28,000 $Kg/cm^2$, and Vicat softening point (15 kg weight) is preferably less than 80° C., more preferably less than 85° C., and most preferably less than 90° C.

The carbon black is loaded in the resin for ensuring a light-shielding function. Carbon blacks may be classified according to production method into furnace black, channel black, thermal carbon black, and so forth, of which preferred are furnace blacks having an average particle diameter from 10 mµ to 80 mµ and PH5 to PH9, and more preferred are furnace blacks having an average particle diameter from 15 mµ to 50 mµ and PH6 to PH8, because these have less unfavorable effects on the photographic film, such as fogging and disordering of sensitivity of the photographic film, but can provide a sufficient light-shielding effect.

Representative examples of preferred carbon blacks on the market include Carbon Black #20(B), #30(B), #33(B), #40(B), #41(B), #44(B), #45(B), #50(B), #55(B), #100, #600(B), #2200, #2400(B), MA8, MA11 and MA100, all produced by Mitsubishi Kasei Corporation; Black Pearls 2, 46, 70, 71, 74, 80, 81 and 607, Regal 300, 330, 400, 660, 991 and SRF-S, Vulcan 3 and 6, Sterling 10, SO, V, S, FT-FF and MT-FF, all produced by Cabot Corp.; and United R, BB, 15, 102, 3001, 3004, 3006, 3007, 3008, 3009, 3011, 3012, XC-3016, XC-3017 and 3020, all produced by Ashland Chemical Co. However, the carbon black is by no means limited to these example.

Furnace black having particles of less than 10 mµ diameter is unsuitable for kneading, so that light-shielding ability and physical strength will be low. Above 100 mµ, dispersing quality is superior, but light-shielding ability is inferior. Increasing the density of carbon black enough to compensate for the inferior light-shielding ability resulted in lowering physical strength and moldability to the extent that the products were hardly useful in practice. Most carbon blacks beyond the range from PH5 to PH9 were not applicable because they were liable to adversely affect photographic properties.

To avoid adverse influence on the photographic properties of the photographic film, free sulfur component of the above-described carbon black should be 0.6% or less, preferably 0.3% or less, and more preferably 0.1% or less. Cyanogen compound component should be 0.01% or less, preferably 0.005% or less, and more preferably 0.001% or less. Aldehyde compound component should be 0.1% or less, preferably 0.05% or less, and more preferably 0.01% or less. It is necessary to pay attention to the fact that even a small amount of these objects have bad effect on photographic properties.

Loading of the furnace carbon black is preferably 0.05 wt% to 3.00 wt%, in the interest of light-tightness, moldability and physical strength of the cassette shell 13. Loading of less than 0.05 wt% results in insufficient light-shielding ability. Loading of more than 3.00 wt% results in lowering physical strength of the cassette shell 13 and increasing water absorption so much that weld-marks, silver streaking and other errors are liable to occur in injection-molding, which result in deterioration of appearance and surface strength.

As the light screen agent, inorganic pigment such as titanium oxide, redoxide, calcium carbide, etc. or organic pigment may be used in combination with the above-described carbon black.

To smooth the cassette shell, a lubricant is loaded in the resin before molding, or the molded product is coated with a lubricant. As lubricants, there are silicone oils, high fatty acid amid such as oleic acid amid and erucic acid amid, high fatty acid metal salt such as zinc stearate, higher alcohol ester, fatty acid ester of polyhydroxy alcohol ester, etc. But the lubricant for use in the invention is not limited to these examples.

Preferred examples of silicone oils to be loaded in the cassette shell are dimethylpolysiloxane and carboxyl-modified silicone oil which are disclosed in JPA 62-286043 or 62-284355. Loading of the silicone oil is from 0.05 wt% to 5.0 wt%, and preferably from 1.0 wt% to 3.0 wt%.

Loading of less than 0.05 wt% has little smoothing effect. Loading of more than 5.0 wt% may cause slipping between the resin and screws in an injection molding machine, thereby elongating molding cycles and also increasing the amount of silicone oil bleeding out to the product surface. The bled-out oil may be transferred to the photographic film contained in the cassette shell, and adversely affect photographic properties of the photographic film, like hindering developing agents from dispersing over the photographic film on photographic processing. In addition, weldability for ultrasonic-sealing of the joints between the upper and lower shell halves is lowered.

The viscosity of silicone oil is preferably from 1000 cs to 60,000 cs at 25° C. Viscosity of less than 1000 cs at 25° C.

results in so large bleed-out that has bad effect on photographic properties. Silicone oil having a viscosity of above 60,000 cs is too difficult to knead into the resin to use in practice. Although there are many kinds of modified silicone oils, such as fluorine-modified silicone oil, on the market, most of them have bad effect on photographic properties of the photographic film, and were found to be inapplicable to the photographic film cassette for many reasons. That is, they cannot sufficiently smooth the resin, or cause remarkable thermal decomposition during inject-molding.

Preferred examples of commercially available resins for forming the cassette shell are K-RESIN #3350 (Phillips Oil Co.), Denka Styrole PSM911Y-14 (Denki Kagaku Kogyo) and Mitsubishi Polytec YH061-00802*1 (Mitsubishi Chemical Co.). K-RESIN #3350 is 0.95 µm in particle diameter and 19.35 Mw in weight-average molecular weight, and contains a rubber component of 7.2 wt%, but does not contain a carbon black and a silicone oil. Denka Styrole PSM991Y-14 is 1.48 µm in particle diameter and 20.4 Mw in weight-average molecular weight, and contains rubber component from 4.4 wt% to 5.0 wt%, a carbon black of 0.5 wt%, and a silicone oil of 2.0 wt%. Mitsubishi Polytec YH061-00802*1 is 0.9 µm in particle diameter and 20.8 Mw in weight-average molecular weight, and contains rubber component from 5.7 wt% to 6.4 wt%, a carbon black of 1.0 wt%, and a silicone oil of 2.0 wt%.

An antioxidant may be added to the resin in order to prevent oxidative destruction and other kinds of decomposition of the resin, and thus prevent generating decomposition products that adversely affect the photographic properties of the photographic film, e.g. alcohol, aldehyde, ketone, carboxylic acid etc.

Representative examples of the antioxidant for use in the present invention are described below.

(a) Phenol-based antioxidant (t stands for "tert"):

Vitamin E, vitamin E carboxylate, 6-t-butyl-3-methylphenyl derivatives, 2,6-di-t-butyl-p-cresol, 2,2'-methylenebis-(4-ethyl-6-t-butylphenol), 4,4'-butyridenebis (6-t-butyl-m-cresol, 4,4'-thiobis(6-t-butyl-m-cresol), 4,4'-dihydroxydiphenylcyclohexane, alkylated bisphenol, styrenated phenol, 2,6-di-t-butyl-3-methylphenol, n-octadecyl-3-(3',5'-di-t-butyl-4'-hydroxyphenyl) propionate, 2,2'-methylenebis(4-methyl-6-t-butylphenol), 4,4'-thiobis(3-methyl-6-t-butylphenol), 4,4'-butylidenebis (3-methyl-6-t-butylphenol), stearyl-β-(3,5-di-t-butyl-4-hydroxyphenyl)propionate, 1,1,3-tris(2-methyl-4-hydroxy-5-t-butylphenyl)butane, 1,3,5-trimethyl-2,4,6-tris(3,5-di-t-butyl-4-hydroxybenzyl) benzene and terakis[methylene-3-(3,5-di-t-butyl-4'-hydroxyphenyl)propionate]methane.

(b) Ketone amine condensate-based antioxidant:

6-Ethoxy-2,2,4-trimethyl-1,2-dihydroquinoline, polymers of 2,2,4-trimethyl-1,2-dihydroquinoline and trimethyldihydroquinoline derivatives.

(c) Allylamine-based antioxidant:

Phenyl-α-naphthylamine, N-phenyl-β-naphthylamine, N-phenyl-N'-isopropyl-p-phenylenediamine, N,N'-dipheenyl-p-phenylenediamine, N,N'-di-β-naphthyl-p-phenylenediamine and N-(3'-hydroxybutylidene)-1-naphthylamine.

(d) Imidazole-based antioxidant:

2-Mercaptobenzoimidazole, zinc salt of 2-mercaptobenzoimidazole and 2-mercaptobenzoimidazole.

(e) Phosphite-based antioxidant:

Alkylated allylphosphite, diphenylisodecylphosphite, sodium tris(nonylphenyl) phosphite, tris(nonylphenyl) phosphite and triphenyl phosphite.

(f) Thiourea-based antioxidant:

Thiourea derivatives and 1,3-bis(dimethylamino-propyl)-2-thiourea.

(g) Other antioxidants useful for air oxidation:

Dilauryl thiodipropionate.

(h) Hindered phenol-based antioxidant:

1,3,5-Trimethyl-2,4,6-tris(3,5-di-t-butyl-4-hydroxybenzyl)benzene, tetrakis[methylene(3,5-di-t-butyl-4-hydroxy-hydrocinnamate]methane, octadecyl-3,5-di-t-butyl-4-hydroxy-hydrocinnamate, 2,2',2'-tris[(3,5-di-t-butyl-4-hydroxyphenyl)propionyloxy]isocyanurate, tetrakis (2,4-di-t-butyl-phenyl)-4,4'-biphenylene diphosphite, 4,4'-thiobis(6-t-butyl-o-cresol), 2,2'-thobis(6-tert-butyl-4-methlphenol), tris(2-methyl-4-hydroxy-5-t-butylphenol) butane, 2,2'-methylenebis(4-methyl-6-tert-butylphenol), 4,4'-methylenebis(2,6-di-t-butylphenol), 4,4'-butylidenebis (3-methyl-6-t-butylphenol), 2,6-di-t-butyl-4-methylphenol, 4-hydorxymethyl-2,6-di-t-butylphenol, 2,6-di-t-4-n-butylphenol, 2,6-bis(2'-hydroxy-3'-t-butyl-3'-methylbenzyl)- 4-methylphenol, 4,4'-methylenebis(6-t-butyl-o-cresol) and 4,4'-butylidene-bis(6-t-butyl-m-cresol). Among these, preferred are antioxidants having a melting point of 100° C. or higher, and more preferably 120° C. or higher, because prevention effects on bleed out and thermal decomposition can be increased without very worsening photographic properties of the photographic film.

Representative examples of commercially available antioxidants are described below.

(1) Phenol-based antioxidant:

SUMILIZER BHT (Sumitomo), YOSHINOX BHT (Yoshitomi), IRGANOX 1076 (Ciba Geigy), MARK A0-50 (Adeca-Argus), SUMILIZER B-76 (Sumitomo), TOMINOX SS (Yoshitomi), IRGANOX 565 (Ciba Geigy), NONOX WSP (ICI), SANTONOX (Monsanto), SUMILIZER WX R (Sumitomo), ANTAGECRYSTAL (Kawaguchi), IRGANOX 1035 (Ciba Geigy), ANTAGE W-400 (Kawaguchi), NOCLIZER NS-6 (Ohuchi Shinko), IRGANOX 1425 WL (Chiba Geigy), MARK A0-80 (Adeca-Argus), SUMILIZER GA-80 (Sumitomo), TOPANOL CA (ICI), MARK A0-30 (Adeca-Argus), MARK A0-20 (Adeca-Argus), IRGANOX 3114 (Ciba Geigy), MARK A0-330 (Adeca-Argus), IRGANOX 1330 (Ciba Geigy), CYANOX 1790 (ACC), IRGANOX 1010 (Ciba Geigy), MARK A0-60 (Adeca-Argus), SUMILIZER BP-101 (Sumitomo) and TOMINOX TT (Yoshitomi).

(2) Phosphorus-based antioxidant:

IRGANOX 168 (Ciba Geigy), MARK 2112 (Adeca-Argus), WESTON 618 (Vorg-Warner), MARK PEP-8 (Adeca-Argus), ULTRANOX 626 (Vorg-Warner), MARK PEP-24G (Adeca-Argus), MARK PEP-36 (Adeca-Argus) and HCA (Sanko).

(3) Thioether-based antioxidant:

DLTDP "YOSHITOMI" (Yoshitomi), SIMILIZER TPL (Sumitomo), ANTIOX L (Nippon Oil), DMTD "YOSHITOMI" (Yoshitomi), SIMILIZER TPT (Sumitomo), ANTIOX M (Nippon Oil), DSTP "YOSHITOMI" (Yoshitomi), SIMILIZER TPS (Sumitomo), ANTIOX (Nippon Oil), SEENOX 412S (Sipro), MARK A0-412S (Adeca-Argus), SIMILIZER TP-D (Sumitomo), MARK A0-23 (Adeca-Argus), SANDSTAB P-EPQ (Sand), IRGANOX P-EPQ FF (Ciba Geigy), IRGANOX 1222 (Ciba Geigy), MARK 329K (Adeca-Argus), WESTON 399 (Vorg-Warner), MARK 260 (Adeca-Argus) and MARK 529A (Adeca-Argus).

(4) Metal Deactivator

NAUGARD XL-1 (Uniroyal), MARK CDA-1 (Adeca-Argus), MARK CDA-6 (Adeca-Argus), IRGANOX MD-1024 (Ciba Geigy) and CUNOX (Mitusi Toatsu).

Preferred are phenol-based antioxidants, and more preferred are hindered phenol-based antioxidants. Commercially available phenol-based antioxidants include IRGANOX series products of Ciba Geigy, SIMILIZER BHT, SIMULIZER BH-76, SUMILIZER WX-R and SUMILIZER BP-101 of Sumitomo Chemical Co., Ltd.

It is effective to use one or more, particularly two or more of 2,6-di-t-butyl-p-cresol (BHT), a low-volatile and high molecular weight hindered phenol-based antioxidant (e.g., IRGANOX 1010, IRGANOX 1076, TOPANOL CA, IONOX 330, all trade names), dilauryl thiodipropionate, distearylthiopropionate and dialkyl phosphate in combination. Since antioxidant is a reducing agent which adversely affects photographic materials, it is necessary to carefully examine its kind and the compounding amount so that degradation of photographic materials may not become a great problem, but its preventing effect against thermal decomposition may be maintained sufficient. In view of this, it is preferable to use phosphorus-based and phenol-based antioxidants, and more preferably hindered phenol-based antioxidants, because these have not much unfavorable effects on the photographic film, such as fogging and disordering of photosensitivity. Among of hindered phenol-based antioxidants, preferred are those having a melting point of 100° C. or higher, and more preferred are 120° C. or higher. It is most preferable to use two or more of the above-described phenol-based and phosphrus-based antioxidants in combination.

In particular, because the anti-oxidant act is synergically activated by light screen agents such as carbon black, it is preferable to use the above-described phenol-based and phosphorus-based antioxidants in combination with carbon black.

In addition, various antioxidants disclosed in *Plastic Data Handbook*, published by KK Kogyo ChosaKai, pp. 794–799, various antioxidants disclosed in *Plastic Additives Data*, issued by KK Kagaku Kogyo Sha, pp. 327–329 and various antioxidants disclosed in *Plastic Age Encyclopedia, Advanced Version*, issued by KK Plastic Age, pp. 211–212 (1986) may be used by selecting antioxidants for use in the present invention.

The following description relates to how to evade bad effects of the above-described antioxidants on photographic films. In general, as thermoplastic resins have more ramifications of $CH_3$, oxygen absorption thereof becomes the larger, and thus oxidative destruction thereof becomes the larger.

Hydrocarbon is thought to be automatically oxidized once a free-radical is generated by dehydration in the presence of oxygen, according to the following formulas as chain reaction:

1) RH–R•)

2) R•+$O_2$–ROO•)

3) ROO•+RH–ROOH+R•)

4) ROOH–RO•+•OH

5) RO•+RH–ROH+R•)

6) •OH+RH–HOH+R•

Thus, the oxidation of hydrocarbon is accelerated to produce a great quantity of alcohols, aldehydes, acids and the like, and they react with each other to produce polymer.

In order to prevent oxidation of hydrocarbon, it is necessary to intercept the above chain reaction. Antioxidant is used for this purpose. In alternative, it is preferable to load radial scavenger as set forth below.

Examples of the radical scavenger include 1,1-diphenyl-2-picrylhydrazyl, 1,3,5-triphenylferdazyl, 2,2,6,6- tetramethyl-4-piperidone-1-oxyl, N-(3-N-oxyanilino-1,3-dimethybutylidene)-aniline oxide, a high valency metal salt such as ferric chloride, diphenylpicrylhydrazine, diphenylamine, hydroquinone, t-butylcatechol, dithiobenzoyldisulfide, p,p'-ditolyltrisulfide, a benzoquinone derivative, a nitro compound and a nitroso compound. Among these, preferred is hydroquinone. The above-described radical scavengers may be used either alone or in combination of several kinds. Compounding amount of redical scavenger may be from 1.000 ppm to 10.000 ppm.

As the antioxidant, there are radical group chain terminator which reacts with radical groups, mainly ROO•, which are chain carriers, to inactivate them, and peroxide decomposer which decomposes hydroperoxide ROOH which is the main source of radical groups, to stabilize it.

The radical group chain terminator includes phenol antioxidant and aromatic amine antioxidant. The peroxide decomposer includes sulfur-containing antioxidant and phosphorus-containing antioxidant.

Since antioxidant is a reducing agent which adversely affects photographic film, unless its kind and the compounding amount is carefully examined, degradation of photographic film becomes a great problem.

Examples of the antistatic agent preferably loaded in the opaque thermoplastic resin for use in the invention are described below.

I. Nonionic
(1) Alkylamine derivative:
  T-B103 (Matsumoto Yushi), T-B104 (Matsumoto Yushi)
  Alkylamide type:
  Polyoxiyethylene alkylamine: Armostat 310 (Lion Fat & Oil)
  Tertiary amine (laurylamine): Armostat 400 (Lion Fat & Oil)
  N,N-bis(2-hydroxyethlcocoamine): Armostat 410 (Lion Fat & Oil)
  Tertiary amine: ANTISTATIC 273C, 273, 273E (Fine Org. Chem.)
  N-hydroxyhexadecyldiethanolamine: Belg. P.654, 049
  N-hydroxyoctadecyldiethanolamine: National Dist.
(2) Fatty acid amide derivative:
  TB-115 (Matsumoto Yushi), Elegan P100 (Nippon Oils & Fats), Erik SM-2 (Yoshimura Yukagaku)
  Hydroxystearic amide
  Oxalic-N,N'-distearylamidebutylester (Hoechst)
  Polyoxyethylenealkylamide
(3) Ether type
  Polyoxyethylenealkylether

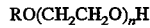

Polyoxyethylenealkylphenyl ether
  Special nonionic type: Resistat 104, PE100, 116–118 (Dai-ich Kogyo Seiyaku), Resistat PE 132, 139 (Dai-ichi Kogyo Seiyaku), Elegan E115, Chemistat 1005 (Nippon Oils & Fats), Erik BM-1 (Yoshimura Yukagaku), Electrostripper TS, TS 2, 3, 5, EA, EA2, 3 (Kao).
(4) Polyhydric alcohol ester type
  Glycerine fatty acid ester: mono-, di- or triglyceride of stearic acid or hydroxystearic acid, monogplyceride (Nippon Shono), TB-123 (Matsumoto Yushi), Resistat 113 (Dai-ichi Kogyo Seiyaku).
  Sorbitan fatty acid ester
    Special ester: Erik BS-1 (Yoshimura Yukagaku)
    1-Hydroxyethyl-2-dodecylglyoxazoline: (British Cellophane)

II. Anionic
(1) Sulfonic acids
  Alkylsulfonate
  $RSO_3Na$
  Alkylbenzonesulfonate
  Alkylsulfate
  $ROSO_3Na$
(2) Phosphric ester type
  Alkyl phosphate
III. Cationic
(1) Amide type cation:
  Resistat PE300, 401, 402, 406, 411 (Dai-ichi Kogyo Seiyaku)
(2) Quaternary ammonium salt
  Quaternary ammonium chloride
  Quaternary ammonium sulfate
  Quaternary ammonium nitrate
  Catimin CSM-9 (Yoshimura Yukagaku), CATANAC 609 (American Cyanamide), Denon 314C (Marubishi Yuka), Armostat 300 (Lion Fat & Oil), 100V (ARMOR), Electrostripper ES (Kao Soap), Chemistat 2009A (Nippon Oils & Fats), Stearamido propyldimethyl-β-hydroxyethyl ammonium nitrate: CATANAC-SN (American Cyanamide)
IV. Ampho-ionic
(1) Alkylbetaine type:
(2) Imidazoline type:
  Leostat 53, 532 (Lion Fat & Oil), AMS 53 (Lion Fat & Oil), AMS 303, 313 (Lion Fat & Oil)
  Alkylimidazoline type
(3) Metal salt type:
  AMS 576 (Lion Fat & Oil)
  Leostat 826, 923 (Lion Fat & Oil)
  $RNR'CH_2CH_2CH_2NCH_2COO$—(Lion Fat & Oil)
  $R=C_{3-N}$ hydrocarbon, A=oxygen or an imino group, M=organic amine or a metal
(4) Alkyl alanine type:
V. Electroconductive Resin
  Polyvinylbenzyl type cation
  Polyvinylic acid type cation
VI. Others:
  Registat 204, 205 (Dai-ichi Kogyo Seiyaku), Elegan 2E, 100E (Nippon Oils & Fats), Chemistat 1002, 1003, 2010 (Nippon Oils & Fats), Erik 51 (Yoshimura Yukagaku), ALROMINE RV-100 (Geigy)

Among the above-described antistatic agents, the nonionic antistatic agent is particularly preferred due to small bad effect on photographic properties and human body.

The total addition amount of two or more antistatic agents is preferably from 0.001 wt% to 5.0 wt%, and more preferably from 0.005 wt% to 3.0 wt%. If the addition amount is less than 0.001 wt%, the addition effect is not satisfactory and only cost for kneading increase. On the other hand, if the addition amount exceeds 5.0 wt%, slipping between the melted resin and the screw of the extruding machine is readily caused and the ejection amount of resin becomes unstable. Further, blocking or bleeding out is liable to be generate by aging after molding.

Other additives may be selectively added to the resin for forming the cassette shell of the invention according to necessary properties and purposes, but the kinds and addition amounts of these additives have to be carefully determined so as not to have bad effect on photographic properties. Example of the other additives are as follows:
(1) Plasticizer
  phthalic acid esters, glycol esters, fatty acid ester, phosphoric acid esters, etc.

(2) Stabilizer lead compounds, cadmium compounds, zinc compounds, alkaline earth metal compound, orgainc tin compounds, etc.

(3) Flame retardant phosphoric acid esters, phosphorric acid ester halides, halides, inorganic materials, polyols containing phosphr, etc.

(4) Filler alumina, kaolin, clay, calcium carbonate, mica, talc, titanium dioxide, silica, etc.

(5) Reinforcing agent glass lobing, metalic fiber, glass fiber, glass milled fiber, carbon fiber, etc.

(6) Blowing agent inorganic blowing agent (ammonium carbonate, sodium bicarbonate), organic blowing agent (nitroso-group and azo-group blowing agents), etc.

(7) Vulcanizing agent vulcanization accelerator, acceleration assistant, etc.

(8) Deterioration preventing agent ultraviolet absorber, metal deactivator, peroxide decomposing agent, etc.

(9) Coupling agent silane compounds, titanium compounds, chromium compounds, aluminum compound, etc.

(10) Various thermoplastic resins, elestomers, rubbers, etc.

What is claimed is:

1. A photographic film cassette wherein a cassette shell comprises a pair of resin molded shell halves which are joined together to enclose a roll of photographic filmstrip therein, a film passage slot formed along and axial joint between said shell halves for allowing said photographic filmstrip to advance to an outside of said cassette shell through said film passage slot, and two fastening members disposed on opposite sides of said film passage slot for fastening said axial joint, each of said fastening members comprising a hook formed integrally with one of said shell halves and a retaining portion formed integrally with the other of said shell halves, said hook being resiliently engaged with said retaining portion to put pressure upon said retaining portion in a direction to secure said shell halves to each other, wherein said axial joint comprises a plurality of pairs of straight joint surfaces disposed on end faces of said cassette shell, each of said pairs of joint surfaces having a different angle from other ones of said pairs of joint surfaces, said hooks exert pressure in a direction orthogonal to each of said pairs of joint surfaces wherein at least a first of said pairs of joint surfaces extends in a first direction radially along said cassette shell and at least a second of said pairs of joint surfaces extends transverse to said first direction to define a predetermined angle between said first of said pairs of joint surfaces and said second of said pairs of joint surfaces, said hooks press against said retaining portions in a direction that bisects said predetermined angle.

2. A photographic film cassette wherein a cassette shell comprises a pair of resin molded shell halves which are joined together to enclose a roll of photographic filmstrip therein, a film passage slot formed along and axial joint between said shell halves for allowing said photographic filmstrip to advance to an outside of said cassette shell through said film passage slot, and two fastening members disposed on opposite sides of said film passage slot for fastening said axial joint, each of said fastening members comprising a hook formed integrally with one of said shell halves and a retaining portion formed integrally with the other of said shell halves, said hook being resiliently engaged with said retaining portion in a predetermined position to put pressure upon said retaining portion in a direction to secure said shell halves to each other, wherein said hook and said retaining portion of each fastening member are secured to each other in said predetermined position by ultrasonic welding and said hook is resiliently deformed in a direction away from said retaining portion by 0.05 mm to 1 mm in said predetermined position.

3. A photographic film cassette as recited in claim 2 wherein said hook is resiliently deformed in a direction away from said retaining portion by 0.1 mm to 0.8 mm in said predetermined position.

4. A photographic film cassette wherein a cassette shell comprises a pair of resin molded shell halves which are joined together to enclose a roll of photographic filmstrip therein, a film passage slot formed along and axial joint between said shell halves for allowing said photographic filmstrip to advance to an outside of said cassette shell through said film passage slot, and two fastening members disposed on opposite sides of said film passage slot for fastening said axial joint, each of said fastening members comprising a hook formed integrally with one of said shell halves and a retaining portion formed integrally with the other of said shell halves, said hook being resiliently engaged with said retaining portion to put pressure upon said retaining portion in a direction to secure said shell halves to each other, each of said hooks being supported on a stem, said stem having a minimum thickness that is less than a minimum thickness of said hook so that said stem is resiliently deformed while said hook is resiliently deformed to be engaged with said retaining portion.

5. A photographic film cassette as recited in claim 4, wherein a cross-sectional area A1 of said hook at its thinnest portion and a cross-sectional area A2 of said stem at its thinnest portion are defined to be $A1/A2 \geq 0.4$.

6. A photographic film cassette as recited in claim 4, wherein said minimum thickness of said hook is 0.3 mm to 2 mm.

7. A photographic film cassette as recited in claim 6, wherein said minimum thickness of said hook is 0.5 mm to 1.5 mm.

* * * * *